(12) United States Patent
Xie et al.

(10) Patent No.: US 10,469,688 B2
(45) Date of Patent: Nov. 5, 2019

(54) CONVEYANCE APPARATUS, IMAGE READING APPARATUS, AND IMAGE FORMING APPARATUS

(71) Applicant: CANON FINETECH NISCA INC., Saitama (JP)

(72) Inventors: Jianxun Xie, Kashiwa (JP); Akira Urita, Tsukuba (JP); Chiaki Yoshiwara, Ibaraki-ken (JP)

(73) Assignee: Canon Finetech Nisca Inc., Misato-shi (JP)

( * ) Notice: Subject to any disclaimer, the term of this patent is extended or adjusted under 35 U.S.C. 154(b) by 0 days.

(21) Appl. No.: 15/611,190

(22) Filed: Jun. 1, 2017

(65) Prior Publication Data
US 2017/0359475 A1    Dec. 14, 2017

(30) Foreign Application Priority Data

Jun. 8, 2016 (JP) .................................. 2016-114681
Jun. 8, 2016 (JP) .................................. 2016-114682
Oct. 19, 2016 (JP) .................................. 2016-205455

(51) Int. Cl.
*H04N 1/00* (2006.01)
*B65H 7/06* (2006.01)
(Continued)

(52) U.S. Cl.
CPC ....... *H04N 1/00777* (2013.01); *B65H 3/0669* (2013.01); *B65H 7/06* (2013.01); *B65H 7/14* (2013.01); *G03G 15/55* (2013.01); *G03G 15/607* (2013.01); *H04N 1/0032* (2013.01); *H04N 1/0066* (2013.01); *H04N 1/00628* (2013.01);
(Continued)

(58) Field of Classification Search
None
See application file for complete search history.

(56) References Cited

U.S. PATENT DOCUMENTS 5,022,642 A * 6/1991 Hasegawa ............ B65H 3/5223
271/10.12
5,823,529 A * 10/1998 Mandel .................. B65H 39/11
271/176
(Continued)

FOREIGN PATENT DOCUMENTS

JP    H05-058512 A    3/1993
JP    H05-085642 A    4/1993
(Continued)

OTHER PUBLICATIONS

Chiaki Yoshiwara et al., U.S. Appl. No. 15/610,795, filed Jun. 1, 2017.
(Continued)

*Primary Examiner* — Beniyam Menberu
(74) *Attorney, Agent, or Firm* — Venable LLP

(57) ABSTRACT

A conveyance apparatus includes a separation unit configured to separate and convey a sheet, a detection unit configured to detect a height-direction deformation of the sheet passing through the separation unit on a downstream side of a sheet-conveying position of the separation unit in a conveyance direction of the sheet, and a control unit configured to stop the sheet conveyed by the separation unit if the detection unit detects the deformation of the sheet.

10 Claims, 20 Drawing Sheets

(51) Int. Cl.
  *B65H 7/14* (2006.01)
  *G06F 3/12* (2006.01)
  *G06K 15/02* (2006.01)
  *B65H 3/06* (2006.01)
  *G03G 15/00* (2006.01)

(52) U.S. Cl.
  CPC ..... *H04N 1/00631* (2013.01); *H04N 1/00726* (2013.01); *H04N 1/00734* (2013.01); *G03G 15/6511* (2013.01); *G03G 15/6567* (2013.01); *H04N 2201/0081* (2013.01); *H04N 2201/0082* (2013.01)

(56) References Cited

U.S. PATENT DOCUMENTS

| | | | |
|---|---|---|---|
| 8,837,017 B2 | 9/2014 | Murakami | |
| 2004/0190958 A1* | 9/2004 | Matsumoto | G03G 15/2032 399/329 |
| 2005/0012259 A1* | 1/2005 | Sano | B65H 7/125 271/10.01 |
| 2005/0133990 A1* | 6/2005 | Mukai | B65H 7/06 271/258.01 |
| 2006/0159470 A1* | 7/2006 | Yasukawa | G03G 15/6561 399/21 |
| 2007/0114716 A1* | 5/2007 | Morikawa | B65H 3/5261 271/258.01 |
| 2008/0265497 A1* | 10/2008 | Kimura | B65H 7/06 271/228 |
| 2009/0051100 A1* | 2/2009 | Hattori | B65H 29/12 271/109 |
| 2010/0096799 A1* | 4/2010 | Shiraiwa | B65H 3/06 271/111 |
| 2010/0295241 A1* | 11/2010 | Isogai | B65H 9/006 271/227 |
| 2012/0001382 A1* | 1/2012 | Yano | B65H 5/062 271/225 |
| 2012/0235929 A1* | 9/2012 | Hongo | B65H 7/06 345/173 |
| 2013/0140757 A1* | 6/2013 | Phinney | G03G 15/607 271/10.01 |
| 2014/0054845 A1* | 2/2014 | Morikawa | B65H 5/00 271/18 |
| 2014/0160515 A1* | 6/2014 | Goda | H04N 1/00811 358/1.14 |
| 2016/0355364 A1* | 12/2016 | Shibata | B65H 31/02 |

FOREIGN PATENT DOCUMENTS

| | | | |
|---|---|---|---|
| JP | H10-039562 A | 2/1998 | |
| JP | 2000-255830 A | 9/2000 | |
| JP | 2004-182449 A | 7/2004 | |
| JP | 2006-206231 A | 8/2006 | |
| JP | 2008-007280 | * 1/2008 | ............ B65H 1/00 |
| JP | 2008-230759 A | 10/2008 | |
| JP | 2010-202296 | * 9/2010 | ............ B65H 7/14 |
| JP | 2012-101900 A | 5/2012 | |
| JP | 2012-162335 A | 8/2012 | |
| JP | 2012-254846 A | 12/2012 | |
| JP | 2015-224118 | * 12/2015 | ............ B65H 9/14 |

OTHER PUBLICATIONS

Copending, unpublished U.S. Appl. No. 15/610,795 to Chiaki Yoshiwara et al., dated Jun. 1, 2017.
Office Action dated Apr. 13, 2018, in Japanese Patent Application No. 2017-113614.

* cited by examiner

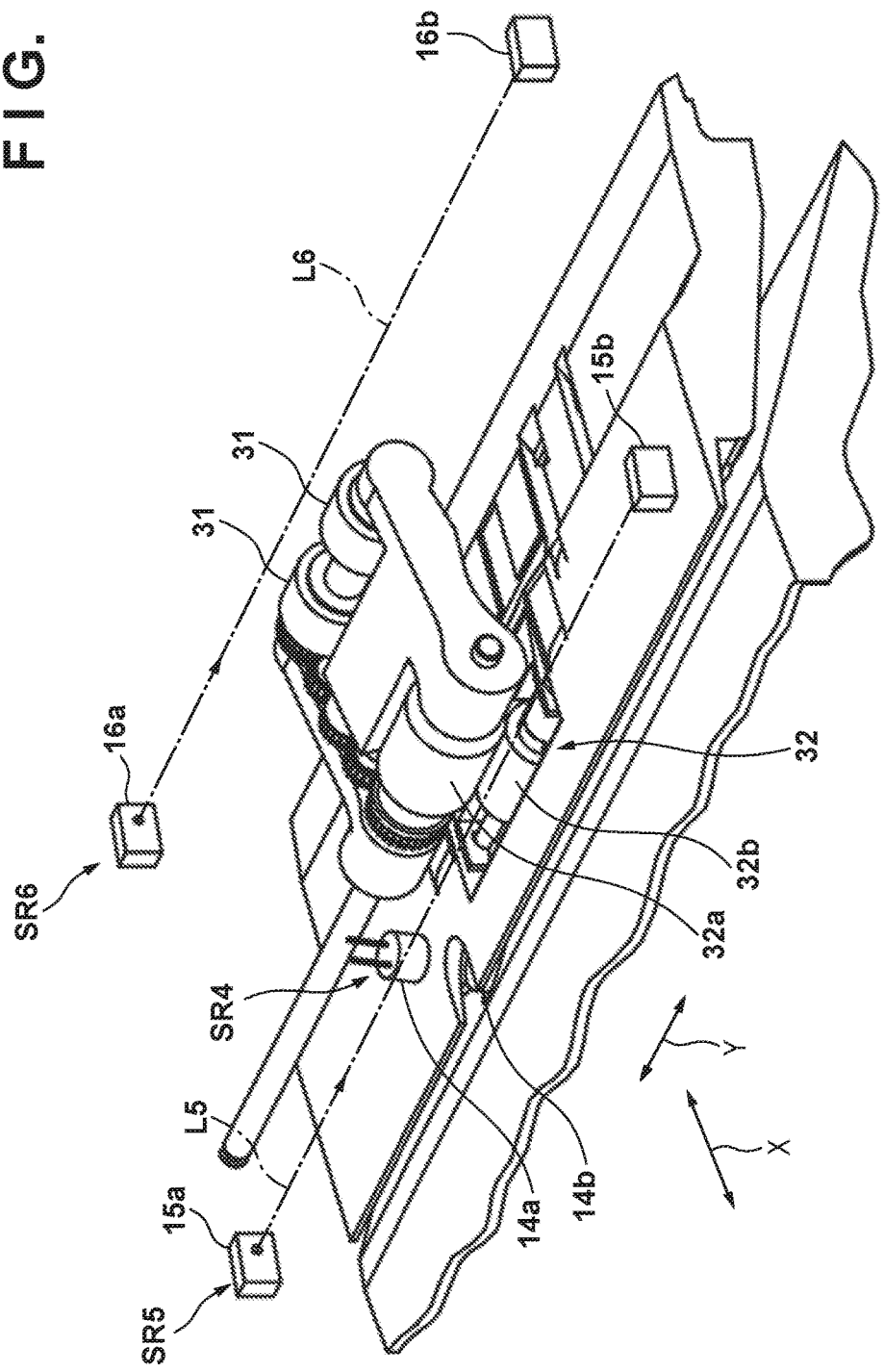

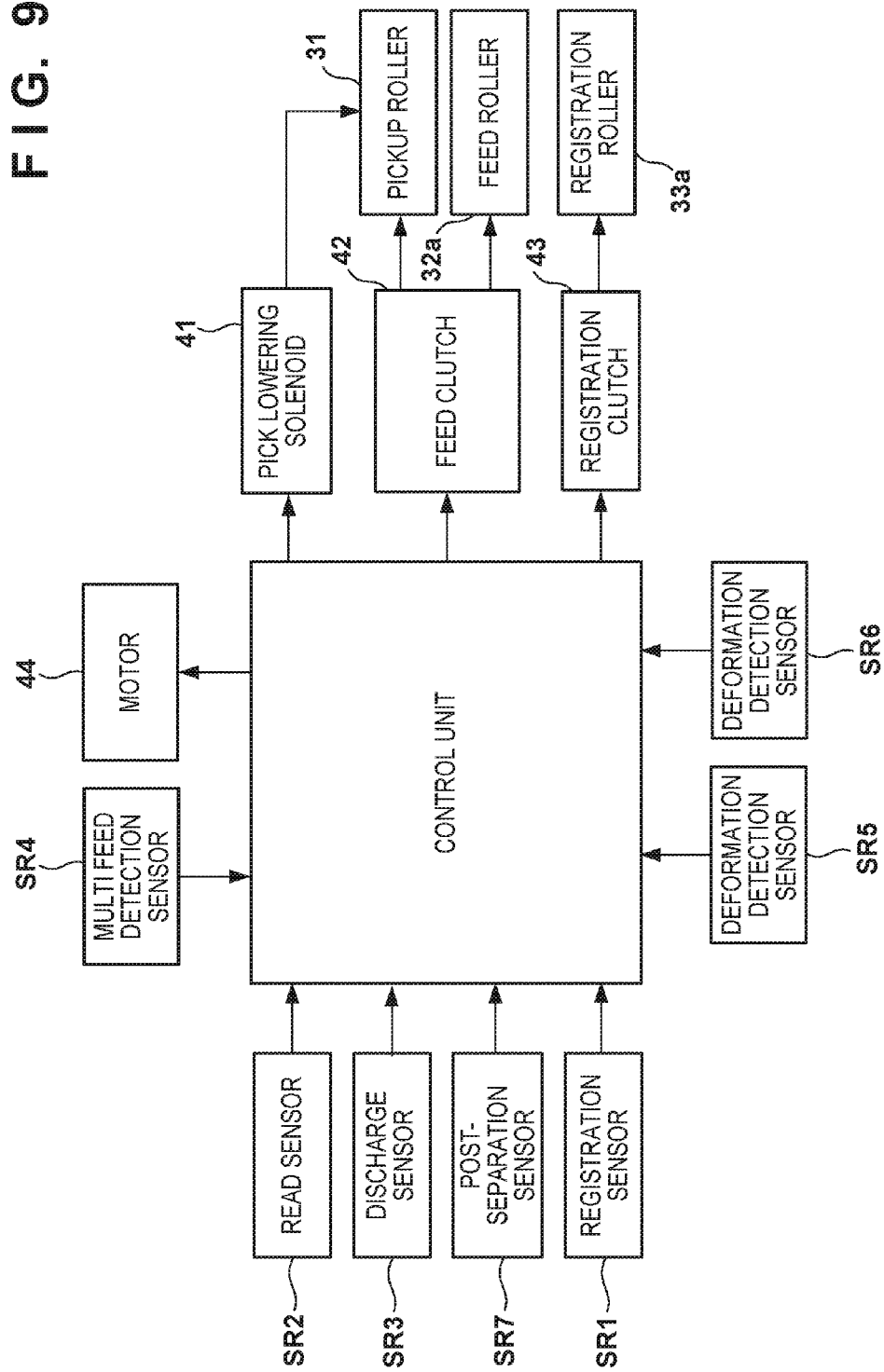

CONVEYANCE APPARATUS, IMAGE READING APPARATUS, AND IMAGE FORMING APPARATUS

BACKGROUND OF THE INVENTION

Field of the Invention

The present invention relates to a conveyance apparatus, an image reading apparatus, and an image forming apparatus.

Description of the Related Art

A feeding device included in a copying machine, a scanner, a facsimile apparatus, or the like is provided with a separation mechanism configured to separate a plurality of sheets and convey them one by one to prevent the sheets from being conveyed in an overlapping state. When such a separation mechanism is provided in a reading apparatus, sheets on a stack table can continuously be fed one by one, and images on the sheets can sequentially be read. On the other hand, a bundle of sheets that are bound by a staple or the like so as to be hard to separate is sometimes erroneously stacked on the stack table. If such a bundle of sheets passes through the separation mechanism, the sheets may be deformed by the separating action and damaged. Measures against this have been proposed (for example, Japanese Patent Laid-Open Nos. 2008-230759 and 2004-182449). In Japanese Patent Laid-Open No. 2008-230759, a plurality of sheet material detection means are provided on the downstream side of a separation means in the sheet conveyance direction. If a difference between sheet material passage timings is detected by the plurality of sheet material detection means, conveyance is stopped to prevent damage to the document.

In the arrangement for detecting a bundle of bound sheets based on the difference between sheet material passage timings detected by the plurality of sheet material detection means, like Japanese Patent Laid-Open No. 2008-230759, even a bundle of unbound sheets may erroneously be detected as a bundle of bound sheets if the sheets are conveyed in a skewed state.

SUMMARY OF THE INVENTION

According to an aspect of the present invention, there is provided a conveyance apparatus comprising a separation unit configured to separate and convey a sheet; a detection unit configured to detect a height-direction deformation of the sheet passing through the separation unit on a downstream side of a sheet-conveying position of the separation unit with respect to a conveyance direction of the sheet; and a control unit configured to stop the sheet conveyed by the separation unit if the detection unit detects the deformation of the sheet.

Further features of the present invention will become apparent from the following description of exemplary embodiments (with reference to the attached drawings).

BRIEF DESCRIPTION OF THE DRAWINGS

FIG. 5 is an explanatory view of deformation detection units;

FIG. 9 is a block diagram of a control unit;

DESCRIPTION OF THE EMBODIMENTS

Figure 1:
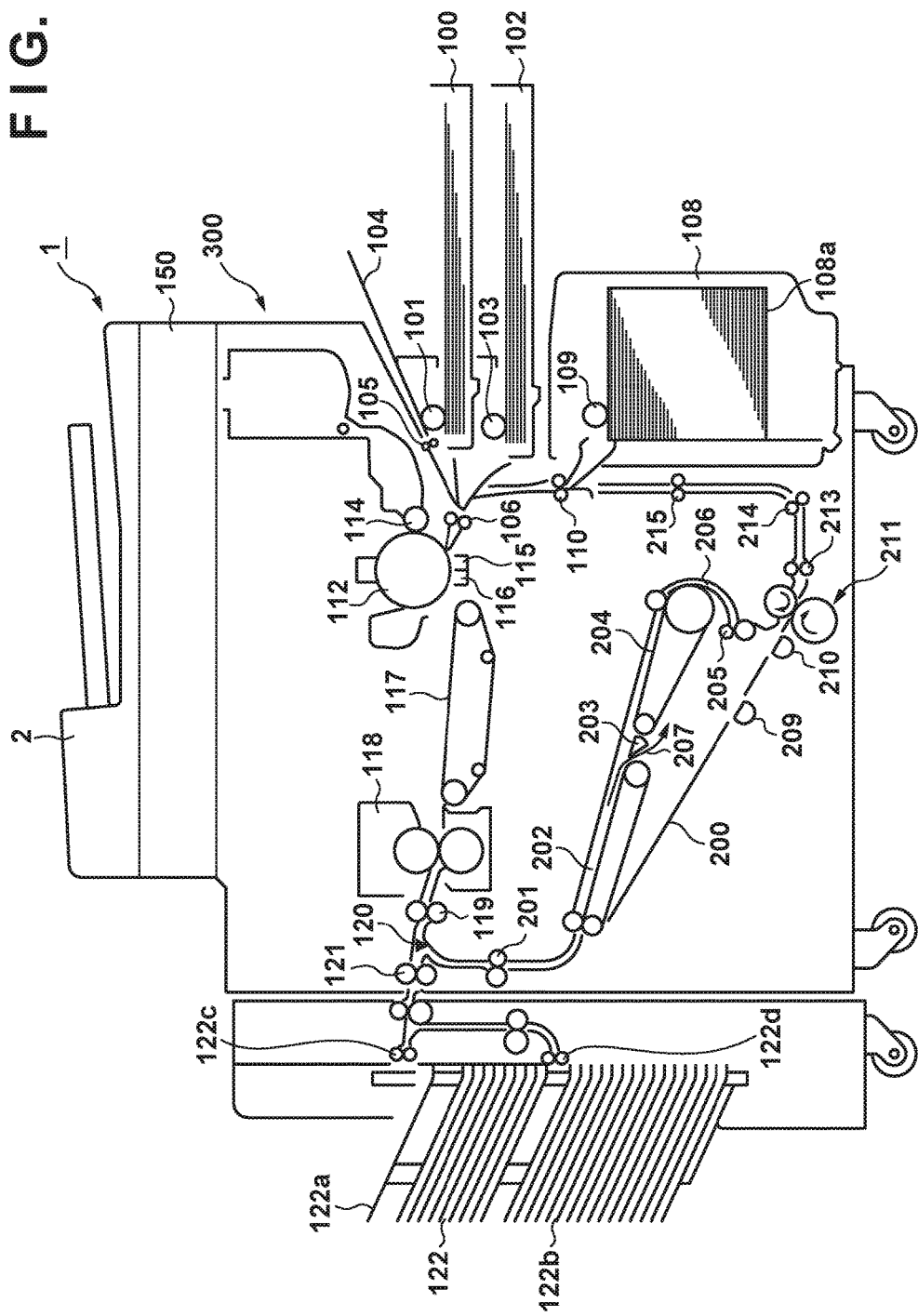
FIG. 1 is a view showing the overall arrangement of an image forming apparatus according to an embodiment of the present invention.

The embodiments of the present invention will be described. The embodiments of the present invention are roughly divided into first to third embodiments. The embodiments and examples and modifications included in the embodiments can be combined with each other as needed.

Note that reference numerals denoting components are used consistently only in an embodiment unless otherwise specified. Hence, for example, the same reference numeral as in the first embodiment may be used as a reference numeral denoting another component in the third embodiment.

First Embodiment

FIG. 1 is a view showing the overall arrangement of an image forming apparatus according to an embodiment of the present invention. The image forming apparatus includes an image reading apparatus 1, and a printing unit 300 configured to print an image read by the image reading apparatus 1 on a sheet (printing medium) such as paper.

<Printing Unit>

In this embodiment, the printing unit 300 is an image printing unit using electrostatic latent image formation. Sheets stacked and stored on an upper cassette 100 are separated and fed one by one by the action of separation grippers and a feed roller 101 and guided to a registration roller 106. A lower cassette 102 also includes separation grippers and a feed roller 103. From a manual feed guide 104, sheets are guided one by one to the registration roller 106 via a roller 105. A deck-type sheet stacking device 108 includes an inner plate 108a to be vertically moved by a motor or the like. Sheets on the inner plate 108a are separated and fed one by one by the action of separation grippers and a feed roller 109 and guided to a conveyance roller 110.

A developer 114, a transfer charger 115, and a split charger 116 are arranged around a photosensitive drum 112 to form an image forming unit. A toner image developed on the photosensitive drum 112 is transferred to a sheet conveyed by the registration roller 106. After that, the sheet is conveyed to a fixing device 118 by a conveying belt 117 to fix the image, and then conveyed to a diverter 120 by a conveyance roller 119.

To discharge the sheet, the sheet is guided to a discharge roller 121 via the diverter 120 and conveyed into a sorter 122. The sorter 122 includes a non-sort tray 122a, a sort bin tray 122b, a non-sort tray discharge roller 122c, and a sort bin tray discharge roller 122d. The non-sort tray 122a and the sort bin tray 122b vertically move to sort the sheets for each stage. Note that a discharge tray may be attached in place of the sorter.

When performing double-sided copy or multiple copy, a sheet after fixing is diverted by the diverter 120 and conveyed by a conveyance roller 201. In double-sided copy, the sheet is discharged to an intermediate tray 200 via belts 202 and 204, a path 206, and a discharge roller 205. In multiple copy, the sheet is discharged to the intermediate tray 200 by a diverter 203. The intermediate tray 200 includes half-moon rollers 209 and 210 configured to feed the sheet, a separation roller pair 211, and conveyance rollers 213, 214, and 215 configured to convey the sheet to the registration roller 106.

<Image Reading Apparatus>

Figure 2:
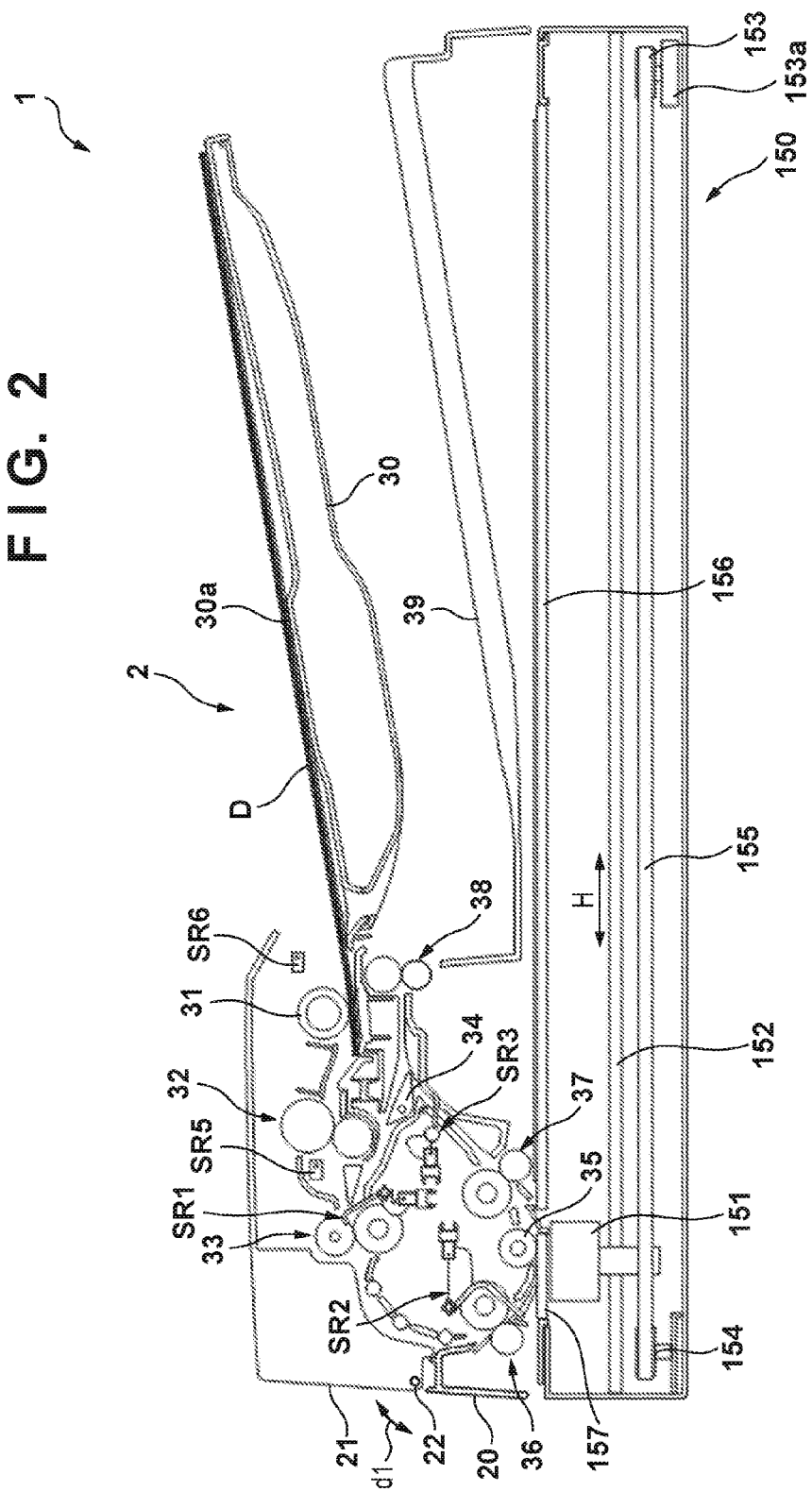
FIG. 2 is a view showing the overall arrangement of an image reading apparatus according to an embodiment of the present invention.

The arrangement of the image reading apparatus 1 will be described with reference to FIG. 2 in addition to FIG. 1. FIG. 2 is a view showing the overall arrangement of the image reading apparatus 1. The image reading apparatus 1 includes an automatic document feeder (to be referred to as a feeding device hereinafter) 2 serving as a sheet conveyance apparatus, and a reading device 150 that reads a document fed by the feeder 2. The feeding device 2 is provided to open/close with respect to the reading device 150.

The reading device 150 includes a reading unit 151, a glass document table 156, and a platen glass 157. The reading device 150 can select a normal reading mode or a flow reading mode as a document reading mode. The glass document table 156 forms a light transmitting unit for the normal reading mode. The platen glass 157 forms a light transmitting unit for the flow reading mode.

The normal reading mode is a mode in which the reading unit 151 is moved in a sub-scanning direction H under the glass document table 156, thereby scanning a document placed on the glass document table 156 and reading an image on the document. The flow reading mode is a mode in which the reading unit 151 is kept at rest at a reading position under the platen glass 157, and an image on a document is read while conveying the document such that it passes on the platen glass 157.

The reading unit 151 is, for example, a contact type image sensor, and includes line sensors arranged in the main scanning direction orthogonal to the sub-scanning direction H. As the guide structure of the reading unit 151, the reading device 150 includes a guide member 152 such as a shaft body extending in the sub-scanning direction H. The reading unit 151 can reciprocally move in the sub-scanning direction H along the guide member 152.

The reading device 150 includes a belt transmission mechanism as a drive mechanism configured to move the reading unit 151. More specifically, the reading device 150 includes a driving pulley 153 and a driven pulley 154 which are spaced apart in the sub-scanning direction H. A belt 155 is wound around them. The driving pulley 153 is rotated by a motor 153a. As the driving pulley 153 rotates, the belt 155 travels. The reading unit 151 is attached to the belt 155. The reading unit 151 moves as the belt 155 travels.

<Feeding Device>

The feeding device 2 will be described with reference to FIGS. 2, 3, and 4. The feeding device 2 conveys a sheet (document) as a reading target in the flow reading mode. In the following explanation, an upstream side and a downstream side are defined based on the sheet conveyance direction.

Figure 3:
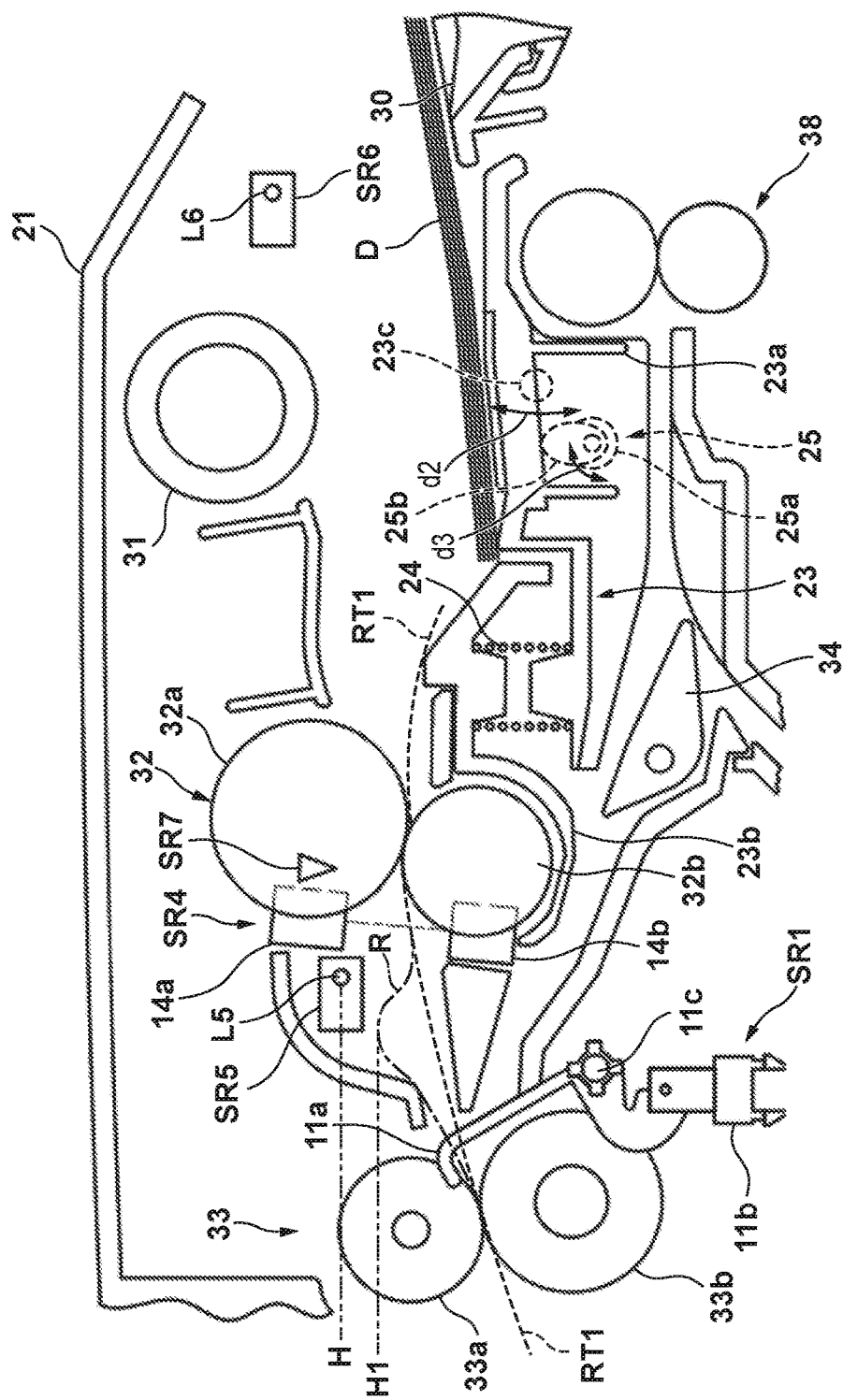
FIG. 3 is an explanatory view of an automatic document feeder.
Figure 4:
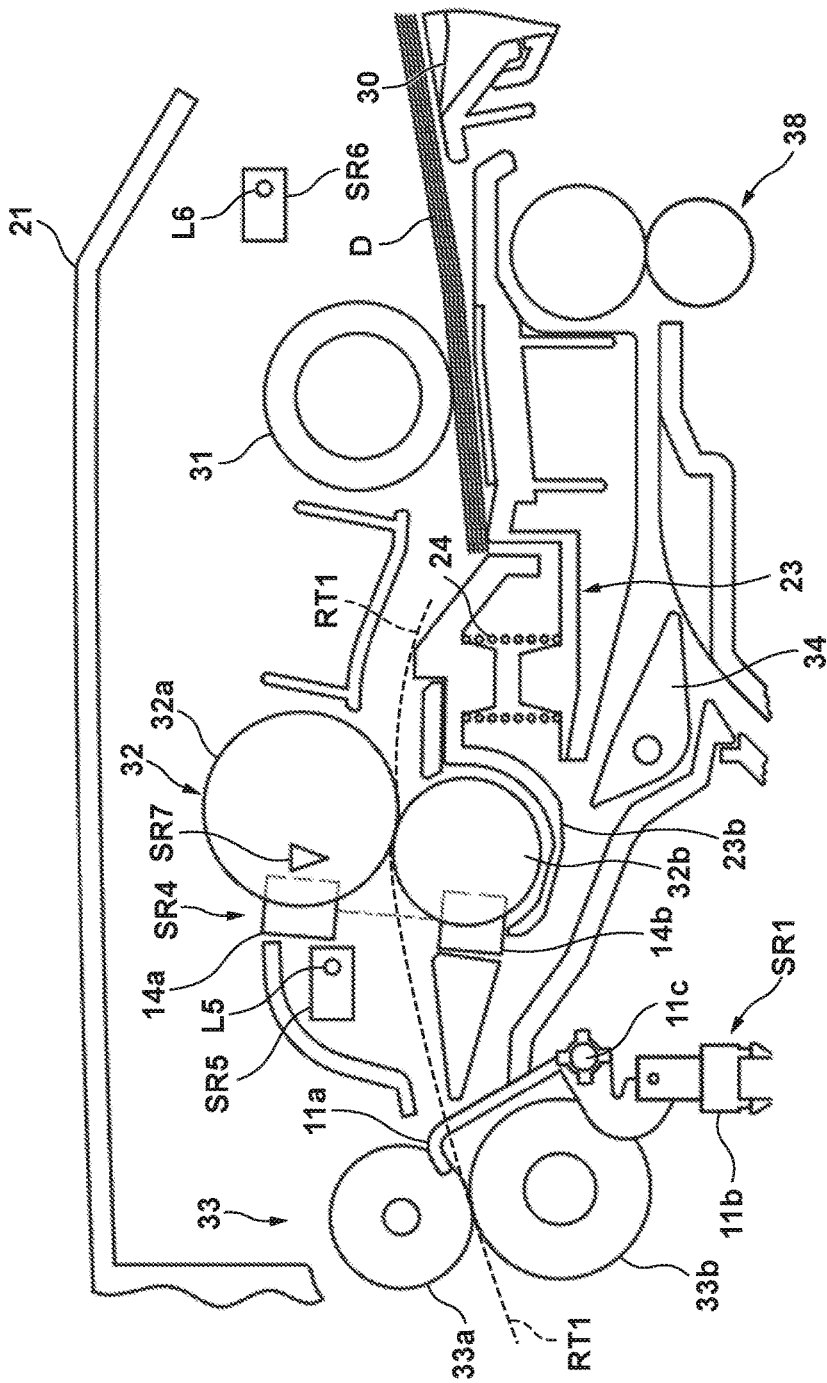
FIG. 4 is an explanatory view of the automatic document feeder.

FIGS. 3 and 4 are explanatory views of the internal arrangement of the feeding device 2. The feeding device 2 includes a stacking unit 30 on which sheets are stacked. Documents D (sheets D) that are image reading targets are stacked on a stack surface 30a of the stacking unit 30.

A pickup roller 31 conveys an uppermost document D of the documents D stacked on the stacking unit 30 to a separation unit 32. The feeding device 2 includes a lifting mechanism for the pickup roller 31. At the time of feed, the pickup roller 31 lowers and contacts the uppermost document D, as shown in FIG. 4. The uppermost document D is conveyed to the separation unit 32 by the rotation of the pickup roller 31. At all times other than the time of feed, the pickup roller 31 is lifted, as shown in FIG. 3. As the lifting mechanism, a known mechanism can be used.

The separation unit 32 is a unit arranged on the downstream side with respect to the pickup roller 31 and configured to separate and convey the documents stacked on the stacking unit 30 one by one. In this embodiment, the separation unit 32 includes a feed roller 32a and a retard roller (separation member) 32b that pressure-contacts the feed roller 32a. The feed roller 32a is rotated to convey the document to the downstream side. The retard roller 32b is provided with a torque limiter, and is dragged by the feed roller 32a when a predetermined load acts. If the documents are conveyed to the separation unit 32 in an overlapping state, the retard roller 32b is not dragged by the feed roller 32a. The document on the side of the feed roller 32a is conveyed, and the sheet on the side of the retard roller 32b is not conveyed. The documents are thus separated and conveyed one by one.

Note that as the arrangement of the separation unit 32, an arrangement that inputs a driving force to the retard roller 32b via the torque limiter to reverse the retard roller 32b or an arrangement that uses another separation member such as a separation pad in place of the retard roller 32b can also be employed.

The retard roller 32b is rotatably supported by a holder 23. The holder 23 includes a main body portion 23a and a support portion 23b connected to the main body portion 23a and having the retard roller 32b mounted on it. A coil spring 24 intervenes between the main body portion 23a and the support portion 23b. The retard roller 32b is brought into pressure-contact with the feed roller 32a by the biasing force of the coil spring 24.

The holder 23 is supported to be swingable in the direction of an arrow d2 about an axis 23c. The feeding device 2 includes a driving unit 25 capable of separating the feed roller 32a and the retard roller 32b. The driving unit 25 includes a motor 25a and a cam 25b that is caused to pivot by the motor 25a. As the cam 25b pivots, the holder 23 swings about the axis 23c. Unusually, the holder 23 is held at a position where the retard roller 32b pressure-contacts the feed roller 32a. If a paper jam or the like occurs, the driving unit 25 makes the holder 23 pivot counterclockwise in FIG. 3 to separate the retard roller 32b from the feed roller 32a. It is therefore possible to easily extract the jammed document to the side of the stacking unit 30.

A conveyance unit 33 is arranged on the downstream side with respect to the separation unit 32 and conveys a sheet passing through the separation unit 32. The conveyance unit 33 includes registration rollers 33a and 33b that are conveyance rollers. They pressure-contact each other to form a nip portion. One of the registration rollers 33a and 33b is a driving roller, and the other is a driven roller. The leading edge of a document is abutted against the nip portion in a state in which the registration rollers 33a and 33b are at rest, thereby correcting a skew of the document.

A platen roller 35 is arranged to face the platen glass 157. A read roller pair 36 is arranged on the upstream side of the platen roller 35, and a read roller pair 37 is arranged on the downstream side. The document passing through the conveyance unit 33 is conveyed by the read roller pair 36, the platen roller 35, and the read roller pair 37 so as to pass on the platen glass 157.

A reversing discharge roller pair 38 conveys the document passing through the read roller pair 37 to a discharge unit 39. The document is stacked on the discharge unit 39. A flapper 34 that switches the conveyance path is provided between the read roller pair 37 and the reversing discharge roller pair 38.

Detection units SR1 to SR7 included in the feeding device 2 will be described next. The detection unit SR1 is a registration sensor arranged between the separation unit 32 and the conveyance unit 33 at a point before the conveyance unit 33. The detection unit SR1 includes a flag 11a that freely pivots about an axis 11c, and a photosensor (photointerrupter) that detects the pivot of the flag 11a. The flag 11a is biased clockwise in FIG. 3 by a spring (not shown). If the document arrives at the conveyance unit 33, the flag 11a is pushed by the document and pivots, and the arrival of the document at the conveyance unit 33 can be detected. Then, the conveyance unit 33 is controlled based on the detection result of the detection unit SR1 to correct the skew of the document. More specifically, the rotation of the conveyance unit 33 is stopped until a predetermined time elapses from document detection by the detection unit SR1. After the elapse of the predetermined time, control is done to rotate the conveyance unit 33 to do conveyance, thereby correcting the skew of the document.

The detection units SR2 and SR3 are sensors having the same arrangement as the detection unit SR1. The detection unit SR2 is a read sensor that detects that the leading edge of the document passes through the read roller pair 36. The start/end of reading of the reading unit 151 is controlled based on the detection result of the detection unit SR2. The detection unit SR3 is a discharge sensor that detects that the leading edge of the document reaches a point before the flapper 34, and is sometimes called a document presence/absence sensor.

The detection unit SR4 is a sensor that detects multi feed of documents, and is sometimes called a multi feed detection sensor. The detection unit SR4 detects multi feed of documents on the downstream side of a sheet-conveying position of the separation unit 32 and on the upstream side of a sheet-conveying position of the conveyance unit 33. In this embodiment, the detection unit SR4 is an ultrasonic sensor. A transmitter 14a and a receiver 14b are arranged on both sides of a conveyance path RT1. If multi feed is detected by the detection unit SR4, conveyance of the document D is stopped.

Each of the detection units SR5 and SR6 is a sensor that detects a deformation of the sheet, and is sometimes called a deformation detection sensor. Details will be described later. The detection unit SR7 is a post-separation sensor that is arranged immediately after the nip portion of the separation unit 32 and detects that the leading edge of the document passes through the separation unit 32. The detection unit SR7 can be, for example, a sensor having the same arrangement as the detection unit SR1.

The feeding device 2 includes a main body unit 20 and a cover member 21. The cover member 21 covers the above-described components such as the pickup roller 31, the separation unit 32, and the conveyance unit 33 from above. The cover member 21 is connected to the main body unit 20 via a hinge portion 22 and freely pivots in the direction of an arrow d1 about the hinge portion 22 serving as the pivot center. Accordingly, as the cover member 21 pivots, the feeding device 2 can be opened/closed, and maintenance can be done if a paper jam or the like occurs. In addition, the pickup roller 31, the feed roller 32a, and the like are supported by the cover member 21. When the cover member 21 is opened, these components move together with the cover member 21. As a result, the maintainability further improves.

An example of the operation of the feeding device 2 in the flow reading mode will be described next. The document D placed on the stacking unit 30 by the user is pulled into the apparatus by the pickup roller 31 and conveyed to the separation unit 32. Even if a plurality of documents are conveyed in a multi feed state, the separation unit 32 separates the documents and conveys them one by one to the conveyance unit 33.

If the detection unit SR1 detects the leading edge of the document D, the leading edge of the document D conveyed by the separation unit 32 is abutted against the conveyance unit 33 that has stopped rotating, thereby correcting a skew of the document D. The detection unit SR1 can be used not only to measure the timing of correcting the skew of the document D but also to measure the feed timing for the next document by the pickup roller 31 in accordance with detection of the trailing edge of the document D or determine the size of the document D in accordance with the timing of detecting the leading edge and the trailing edge of the document D.

The document D that has undergone the skew correction is conveyed to the read roller pair 36. Image reading by the reading unit 151 is started at a reading timing based on detection of the leading edge of the document D by the detection unit SR2. At this time, the reading unit 151 reads the image of the document D that is conveyed in a state in which the floating amount from the upper surface of the platen glass 157 is regulated by the platen roller 35 that rotates at a predetermined rotational speed. In this embodiment, the skew of the document D is corrected by controlling the rotation/stop timing of the roller. However, a shutter member may be provided, and the skew of the document D may be corrected by opening/closing the shutter.

The document D is conveyed by the read roller pairs 36 and 37 while its image is read by the reading unit 151. When reading only one surface of the document D, the document D that has undergone the image reading is conveyed by the read roller pair 37 to the reversing discharge roller pair 38 and discharged to the discharge unit 39.

When reading both surfaces of the document D, after the reading of the first surface, the reversing discharge roller pair 38 that is discharging the document D is stopped. After that, the reversing discharge roller pair 38 is rotated in the reverse direction to bring the document D back into the apparatus. Then, the flapper 34 switches the conveyance path to a reversing conveyance path RT2 to feed the document D to the conveyance path RT1 again. The reading unit 151 reads the second surface in accordance with the same procedure as described above. After that, the document is discharged to the discharge unit 39, as in the single-sided reading.

<Detection of Sheet Deformation>

In this embodiment, the detection units SR5 and SR6 are arranged to detect a deformation, in particular, floating of the document which occurs when a bundle of documents bound by a staple or the like passes through the separation unit 32. The floating of the sheet means a deformation of the sheet in a height direction at a side of the feed roller 32a of the separation unit 32. The detection units SR5 and SR6 are arranged so as to detect a sheet at a level higher than a level where a conveyed sheet passes in a normal state in the height direction at the side of the feed roller 32a of the feed roller 32a and the retard roller 32b, and therefore the detection units SR5 and SR6 detect a sheet conveyed by the separation unit 32 in an abnormal state. FIG. 5 is an explanatory view of the detection units SR5 and SR6. Referring to FIG. 5, an arrow X represents the conveyance direction of the document (the path direction of the conveyance path RT1), and an arrow Y represents the widthwise direction of the conveyance path RT1.

The detection unit SR5 is a sensor that detects the deformation of the sheet passing through the sheet-conveying position of the separation unit 32 at a position on the downstream side of the sheet-conveying position of the separation unit 32 and on the upstream side of the sheet-conveying position of the conveyance unit 33. Thus, the detecting position of the detection sensor SR5 is set at a position on the downstream side of the sheet-conveying position of the separation unit 32 and on the upstream side of the sheet-conveying position of the conveyance unit 33. In this embodiment, the detection unit SR5 detects the deformation of the sheet at a position closer to the separation unit 32 than the conveyance unit 33. This enables quicker detection of the sheet deformation that occurs on the downstream side of the sheet-conveying position of the separation unit 32.

The detection unit SR6 is a sensor that detects the deformation of the sheet passing through the sheet-conveying position of the separation unit 32 at a position on the upstream side of the sheet-conveying position of the separation unit 32. Thus, the detecting position of the detection unit SR6 is set at a position on the downstream side of the sheet-conveying position of the separation unit 32. In this embodiment, the detection unit SR6 is arranged to detect the deformation of the sheet at a position on the upstream side of a sheet-conveying position of the pickup roller 31. It is therefore possible to more quickly detect the sheet deformation that occurs on the upstream side of the sheet-conveying position of the separation unit 32.

In this embodiment, the detection units SR5 and SR6 are transmission-type photosensors. However, these sensors may be sensors of another type. For example, they may be flag-type sensors like the detection unit SR1.

The detection unit SR5 includes a light-emitting portion 15a and a light-receiving portion 15b. The light-emitting portion 15a and the light-receiving portion 15b are arranged on one lateral side and the other lateral side of the conveyance path RT1 in the widthwise direction Y, and face each other. The light-emitting portion 15a and the light-receiving portion 15b are arranged at an interval larger than the width of a document in the maximum size. An optical path L5 from the light-emitting portion 15a to the light-receiving portion 15b is set to cross the conveyance path RT1. The optical path L5 is the detection position of the detection unit SR5. In this embodiment, the optical path L5 is parallel to the widthwise direction Y. However, the optical path L5 may tilt with respect to the widthwise direction Y.

The optical path L5 is set at a position apart upward from the conveyance plane of the conveyance path RT1. This can prevent a document that is normally conveyed from being erroneously detected. In addition, the optical path L5 is set at a position not to detect a sheet that bends due to skew correction. In this embodiment, the height of the optical path L5 from the conveyance path RT1 is increased, thereby preventing a sheet bending due to skew correction from being detected. Referring to FIG. 3, a bending R represents the maximum design bending of a sheet that bends in skew correction. By setting the optical path L5 outside the range of the bending R, the sheet that bends due to skew correction can be prevented from being detected erroneously. In this embodiment, the optical path L5 is set at a position higher than a height H1 of the bending R, thereby preventing the bending R from being detected.

In this embodiment, the detection unit SR6 is formed like the detection unit SR5. The detection unit SR6 includes a light-emitting portion 16a and a light-receiving portion 16b. The light-emitting portion 16a and the light-receiving portion 16b are arranged on one lateral side and the other lateral side of the stacking unit 30 in the widthwise direction Y, and face each other. The light-emitting portion 16a and the light-receiving portion 16b are arranged at an interval larger than the width of a document in the maximum size. An optical path L6 from the light-emitting portion 16a to the light-receiving portion 16b is set to cross the stack surface 30a of the stacking unit 30. In this embodiment, the optical path L6 is parallel to the widthwise direction Y. However, the optical path L6 may tilt with respect to the widthwise direction Y.

The optical path L6 is set at a position apart upward from the stack surface 30a and set at a position higher than the upper limit height of stacked documents. This can prevent a document that is normally conveyed from being erroneously detected.

Examples of document deformation detectable by the detection units SR5 and SR6 will be described next. Types of a bundle of documents bound by staples and examples of deformation will be described first with reference to FIGS. 6A to 6E and FIGS. 7A to 8B. In FIGS. 6A to 6E, arrows indicate the document conveyance direction.

Figure 6A:
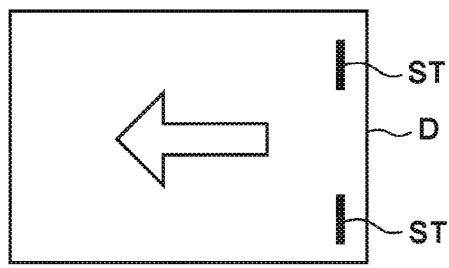
FIGS. 6A to 6E are views showing examples of document binding by staples.
Figure 7A:
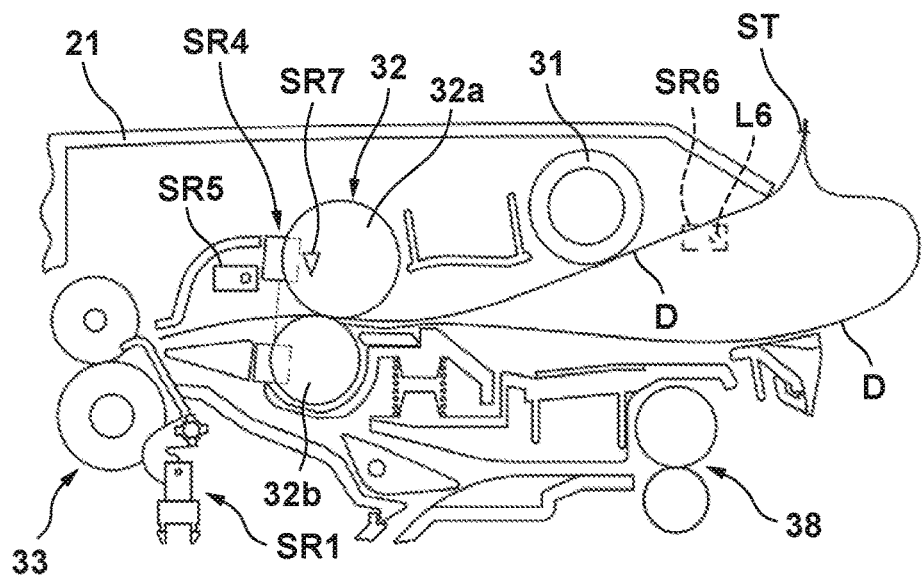
FIGS. 7A and 7B are views showing an example of a document deformation.

FIG. 6A shows a bundle of documents bound by a plurality of staples ST along the edge on the trailing edge side in the conveyance direction. FIG. 7A shows the behavior of the bundle of documents passing through the separation unit 32. In the bundle of documents bound on the trailing edge side, the conveyance of the document D (uppermost document) on the side of the feed roller 32a progresses, and the conveyance of the document D on the side of the retard roller 32b stops due to the separation action of the separation unit 32 on the leading edge side. For this reason, the trailing edge side of the bundle of documents bound by the staples ST floats in a loop shape. In this example, since the bundle of documents is bound by the plurality of staples ST along the edge, the trailing edge side of the bundle of documents floats in a wavy pattern almost evenly in the widthwise direction. Such a deformation can be detected by the detection unit SR6.

Figure 6C:
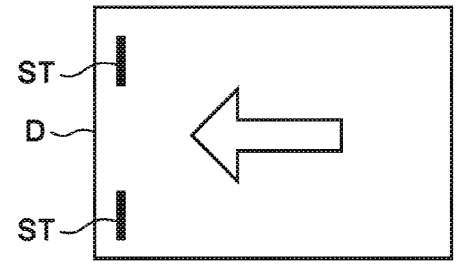
Figure 6B:
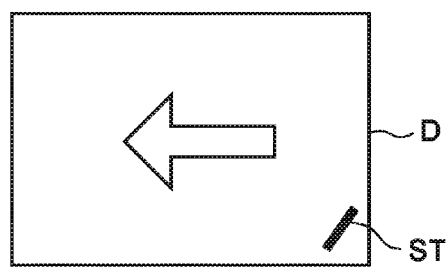
Figure 7B:
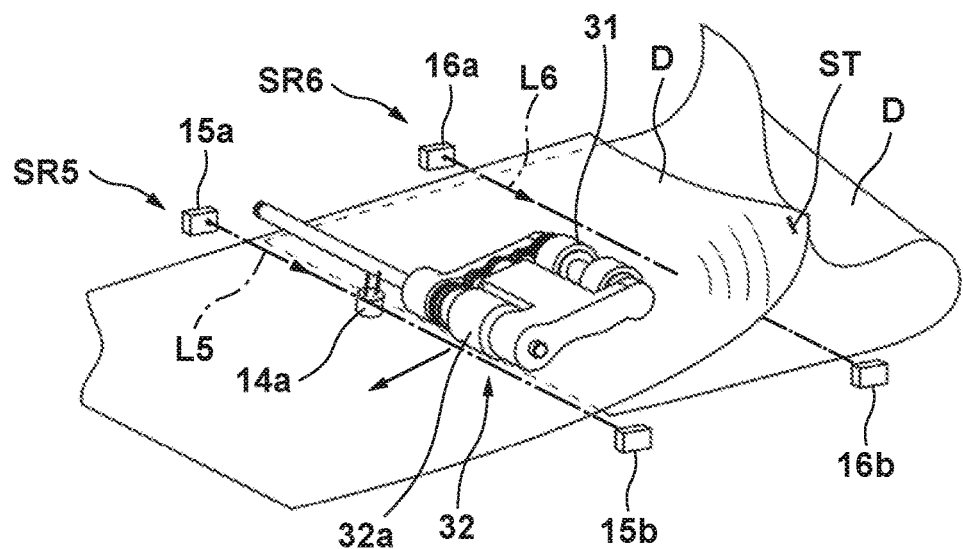

FIG. 6B shows a bundle of documents bound by the staple ST at one corner on the trailing edge side in the conveyance direction. FIG. 7B shows the behavior of the bundle of documents passing through the separation unit 32. In the bundle of documents bound on the trailing edge side, the conveyance of the document D (uppermost document) on the side of the feed roller 32a progresses, and the conveyance of the document D on the side of the retard roller 32b stops due to the separation action of the separation unit 32 on the leading edge side. For this reason, the trailing edge side of the bundle of documents bound by the staple ST floats in a loop shape. In this example, since the bundle of documents is bound by the staple ST at one corner, the trailing edge side of the bundle of documents floats unevenly in the widthwise direction, and the side of the staple ST floats higher. Such a deformation can be detected by the detection unit SR6.

Figure 8A:
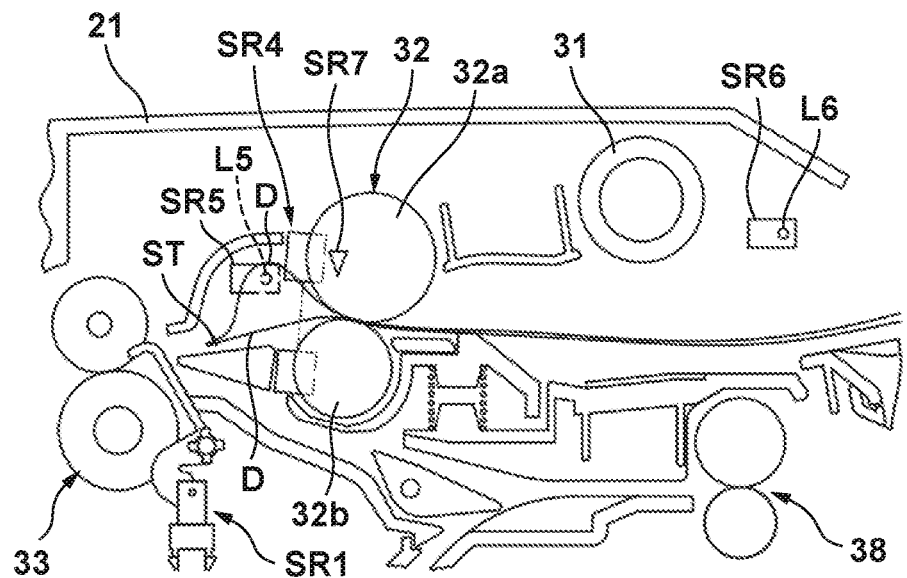
FIGS. 8A and 8B are views showing an example of a document deformation.

FIG. 6C shows a bundle of documents bound by the plurality of staples ST along the edge on the leading edge side in the conveyance direction. FIG. 8A shows the behavior of the bundle of documents passing through the separation unit 32. For the bundle of documents bound on the leading edge side, the separation action of the separation unit 32 tends to be effective after the staples ST pass through the separation unit 32. Additionally, on the trailing edge side of the bundle of documents, the documents are not restrained. For this reason, the leading edge side of the bundle of documents bound by the staples ST floats in a loop shape on the downstream side of the separation unit 32. In this example, since the bundle of documents is bound by the plurality of staples ST along the edge, the leading edge side of the bundle of documents floats in a wavy pattern almost evenly in the widthwise direction. Such a deformation cannot be detected by the detection unit SR6. In this embodiment, however, the detection unit SR5 or SR4 can detect the deformation.

Figure 6D:
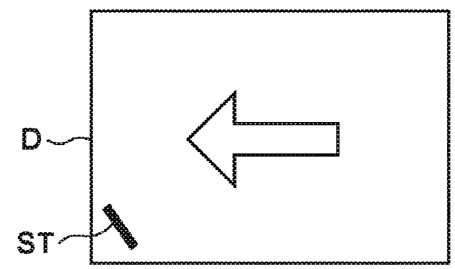
Figure 8B:
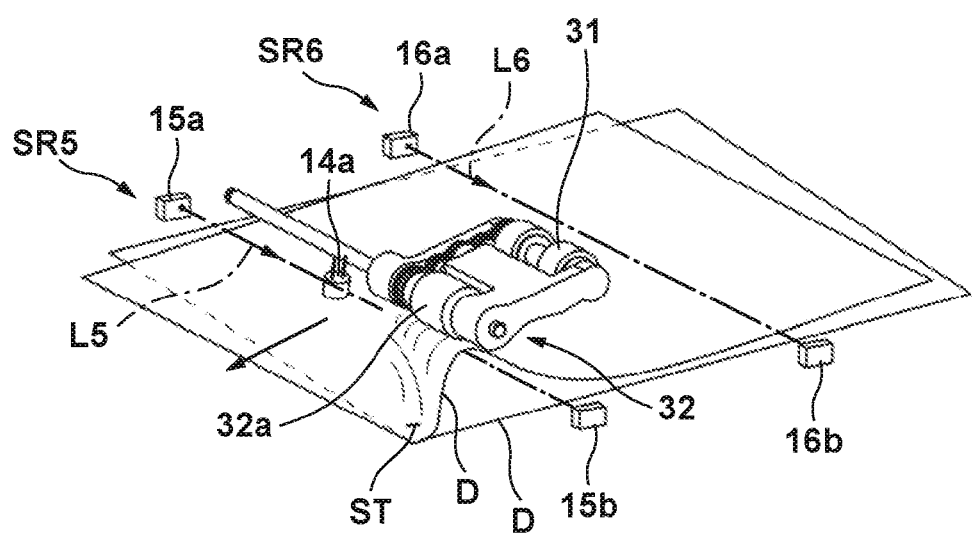

FIG. 6D shows a bundle of documents bound by the staple ST at one corner on the leading edge side in the conveyance direction. FIG. 8B shows the behavior of the bundle of documents passing through the separation unit 32. As in the example shown in FIGS. 6C and 8A, the leading edge side of the bundle of documents bound by the staple ST floats in a loop shape on the downstream side of the separation unit 32. In this example, since the bundle of documents is bound by the staple ST at one corner, the leading edge side of the bundle of documents floats unevenly in the widthwise direction, and the side of the staple ST floats higher. Such a deformation cannot be detected by the detection unit SR6. The detection unit SR4 can detect the deformation in some cases. However, depending on the deformation pattern, the document D does not overlap at the detection position of the detection unit SR4, and the deformation may be undetectable. In this embodiment, however, the detection unit SR5 can detect the deformation.

Figure 6E:
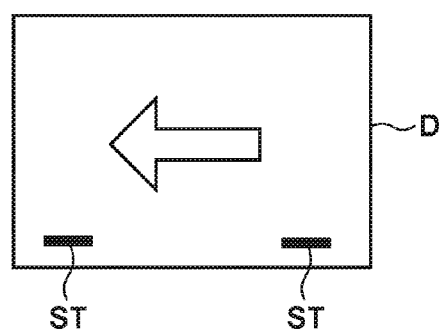

FIG. 6E shows a bundle of documents bound by the staples ST on a lateral side in the conveyance direction. The behavior of the bundle of documents passing through the separation unit 32 is the same as in the example of FIG. 8B. The detection unit SR5 can detect the deformation.

As described above, in this embodiment, since the detection unit SR5 is provided, the bundle of documents bound on the leading edge side in the conveyance direction can be detected more quickly. In addition, since the optical path L5 of the detection unit SR5 is set not to detect the document bending due to skew correction, a detection error can be suppressed.

<Control>

A control system provided in the feeding device 2 will be described with reference to FIG. 9. The control circuit of the feeding device 2 is formed with a control unit 40 as the main component. The control unit 40 is, for example, a microcomputer including a CPU, a memory for storing data and programs to be executed by the CPU, and an interface to an external device. The detection units SR1 to SR7 are connected to the input ports of the control unit 40. A motor 44, a pick lowering solenoid 41, a feed clutch 42, and a registration clutch 43 are connected to the output ports. The motor 44 includes various kinds of motors. The various kinds of motors include, for example, motors serving as the driving sources of the pickup roller 31, the feed roller 32a, and the registration roller 33a or 33b and the motor 25a. In this embodiment, an arrangement in which the pickup roller 31, the feed roller 32a, and the registration roller 33a or 33b are driven by a common conveyance motor is assumed.

The pick lowering solenoid 41 is a solenoid configured to lower the pickup roller 31. The pickup roller 31 is biased to the rising position by a spring (not shown). When the pick lowering solenoid 41 is driven, the pickup roller 31 lowers to the lowering position and abuts against the document D stacked on the stacking unit 30. The feed clutch 42 is an electromagnetic clutch that interrupts the driving force of the conveyance motor to the feed roller 32a and the pickup roller 31. The registration clutch 43 is an electromagnetic clutch that interrupts the driving force of the conveyance motor to the registration roller 33a or 33b.

Figure 10:
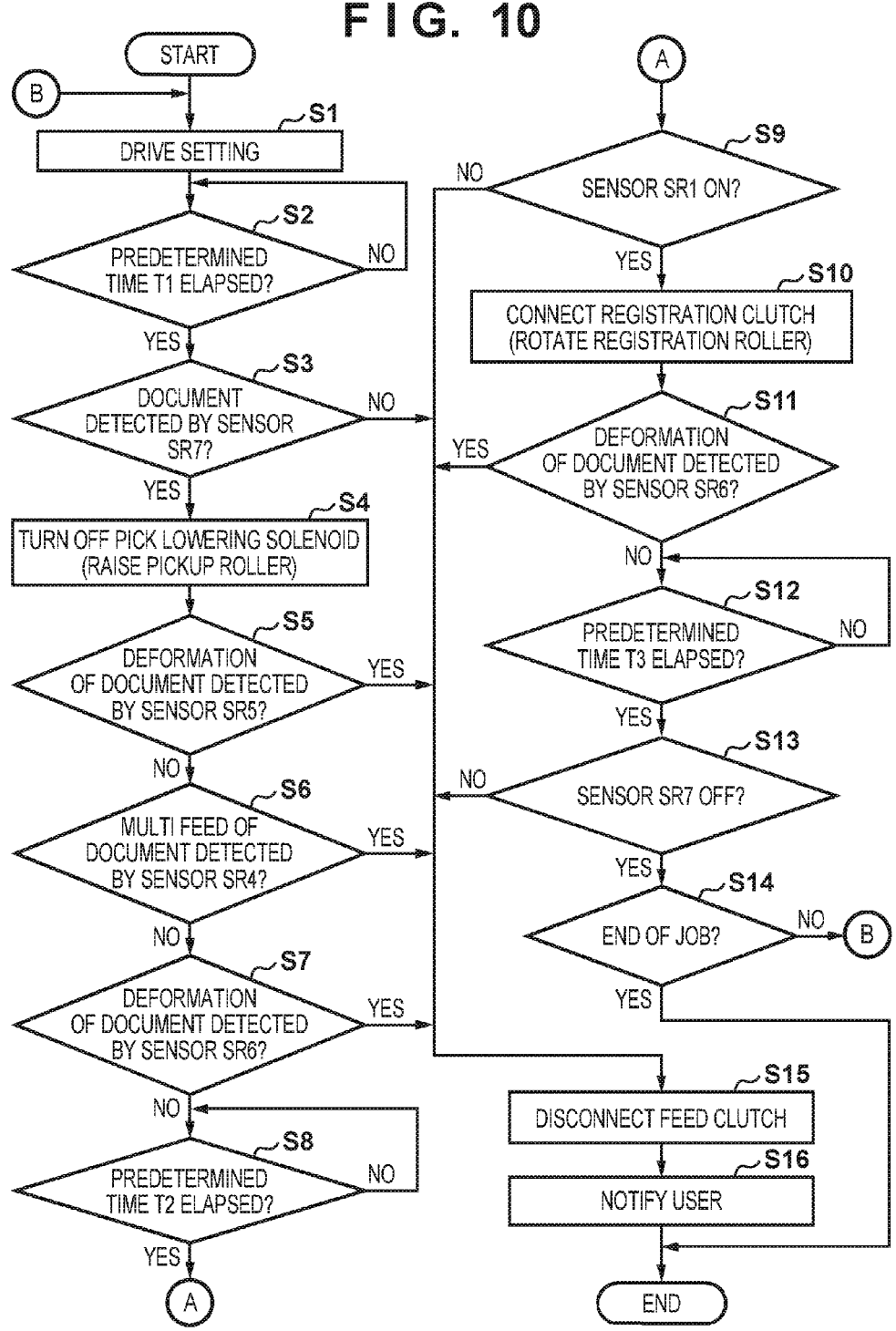
FIG. 10 is a flowchart showing an example of control.

An example of feed control executed by the control unit 40 will be described with reference to FIG. 10. Control in a case in which the document D is fed from the stacking unit 30 to the downstream side of the conveyance unit 33 will be exemplified here.

When the user sets the document D on the stacking unit 30 and starts feeding, drive setting is done in step S1. Here, the pick lowering solenoid 41 is driven to lower the pickup roller 31 and abut it against the uppermost document D stacked on the stacking unit 30. In addition, the feed clutch 42 is connected to transmit the driving force of the conveyance motor to the pickup roller 31 and the feed roller 32a, and feeding is started.

In step S2, it is determined whether a predetermined time T1 has elapsed from the start of feeding in step S1. At this time, the predetermined time T1 is set to a time to enable detection of an abnormality such as a state in which the document is not normally conveyed due to a conveyance failure after the feeding is started until the post-separation sensor SR7 detects the document which reaches the separation unit 32.

If the predetermined time T1 has not elapsed from the start of feeding (NO in step S2), the processing waits until the predetermined time elapses. If the predetermined time T1 has elapsed from the start of feeding (YES in step S2), it is determined in step S3 whether the post-separation sensor SR7 detects the document.

If the post-separation sensor SR7 does not detect the document (NO in step S3), it is determined that the document is not normally conveyed. The process advances to step S15 to disconnect the feed clutch 42 to cut off the transmission of the driving force of the conveyance motor to the feed roller 32a. The conveyance of the document D by the separation unit 32 thus stops. After that, in step S16, the user is notified of the occurrence of the error. At this time, the notification to the user can be made by a voice or display by a display device.

If the post-separation sensor SR7 detects the document (YES in step S3), the process advances to step S4. In step S4, the drive of the pick lowering solenoid 41 is stopped to raise the pickup roller 31.

In step S5, it is determined whether a deformation of the document D is detected by the deformation detection sensor SR5. If no deformation is detected (NO in step S5), the process advances to step S6. If a deformation is detected (YES in step S5), it is determined that the document is a document bound by a staple or the like. The process advances to step S15 to stop the conveyance of the document. In step S6, it is determined whether multi feed of the document D is detected by the multi feed detection sensor SR4. If multi feed is not detected (NO in step S6), the process advances to step S7. If multi feed is detected (YES in step S6), it is determined that documents bound by a staple or the like or documents that cannot completely be separated by the separation unit 32 are conveyed in a multi feed state. The process advances to step S15 to stop the conveyance of the document. In step S7, it is determined whether a deformation of the document D is detected by the deformation detection sensor SR6. If no deformation is detected (NO in step S7), the process advances to step S8. If a deformation is detected (YES in step S7), it is determined that the document is a document bound by a staple or the like. The process advances to step S15 to stop the conveyance of the document.

In step S8, it is determined whether a predetermined time T2 has elapsed from document detection by the post-separation sensor SR7. At this time, the predetermined time T2 is set to a time to enable detection of an abnormality such as a state in which the document is not normally conveyed due to a conveyance failure after the document detection by the post-separation sensor SR7 until the document reaches the registration sensor SR1.

If the predetermined time T2 has not elapsed from the document detection by the post-separation sensor SR7 (NO in step S8), the processing waits until the predetermined time elapses. If the predetermined time T2 has elapsed from the document detection by the post-separation sensor SR7, it is determined in step S9 whether the registration sensor SR1 detects the document.

If the registration sensor SR1 does not detect the document (NO in step S9), it is determined that the document is not normally conveyed. The process advances to step S15 to stop the conveyance of the document. If the registration sensor SR1 detects the document (YES in step S9), the process advances to step S10. In step S10, after the elapse of a time necessary for skew correction, the registration clutch 43 is connected to transmit the driving force of the conveyance motor to the registration roller 33a or 33b and convey the document D. As described above, the registration clutch 43 is connected to rotate the registration roller 33a or 33b after the elapse of the predetermined time from detection of the arrival of the document at the registration roller 33a or 33b by the registration sensor SR1. This makes it possible to correct skew even if the document is conveyed in a skewed state.

In step S11, it is determined whether a deformation of the document D is detected by the deformation detection sensor SR6. If no deformation is detected, the process advances to step S12. If a deformation is detected, the process advances to step S15. In step S12, it is determined whether a predetermined time has elapsed from connection of the registration clutch 43 in step S10. At this time, a predetermined time T3 is set to a time to sufficiently convey the document by the registration roller 33a or 33b and enable detection of an abnormality such as a state in which the document is not normally conveyed due to a conveyance failure until the document passes the position of the post-separation sensor SR7.

If the predetermined time has not elapsed from the connection of the registration clutch 43 (NO in step S12), document conveyance by the registration roller 33a or 33b is continued until the predetermined time T3 elapses. If the predetermined time T3 has elapsed from the connection of the registration clutch 43 (YES in step S12), the process advances to step S13 to determine whether the post-separation sensor SR7 is turned off to stop detecting the document D. If the post-separation sensor SR7 detects the document D even after the elapse of the predetermined time T3 (NO in step S13), it is determined that the document is not normally conveyed. The process advances to step S15 to stop the conveyance of the document. If the post-separation sensor SR7 does not detect the document D after the elapse of the predetermined time T3 (YES in step S13), and the job is not ended (NO in step S14), the process returns to step S1 to feed the next document D. If the job is ended (YES in step S14), the document feeding operation is ended.

In step S15, the conveyance of the document may be stopped by stopping the conveyance motor or separating the retard roller 32b from the feed roller 32a by the driving unit 25. In step S15, not only the conveyance of the documents D by the separation unit 32 but also each conveying section in the apparatus 1 as a whole can be stopped. In this case, each conveying section in the apparatus 1 can simultaneously be stopped, or each conveying section in the apparatus 1 can be stopped in order from a conveying section which is conveying a sheet. In a case that there is a sheet which is normally conveyed at the downstream side of the sheet-conveying position of the separation unit 32 when the conveying documents D by the separation unit 32 should be stopped, each conveying section in the apparatus 1 can be stopped after discharging the sheet.

As described above, a height-direction deformation with respect to the document conveyance direction is detected to detect documents bound by a staple or the like. This makes it possible to detect a document deformation that occurs when the bound document passes through the separation unit 32 and stop the conveyance by correctly detecting the bound document. It is therefore possible to prevent a normally conveyable document from being erroneously detected as a bound document and prevent the conveyance from being erroneously stopped.

In addition, the deformation detection sensor SR5 is provided on the downstream side of the separation unit 32 in the conveyance direction. Even if documents are bound by a staple or the like on the leading edge side (downstream side) in the conveyance direction, it is possible to detect a bending of a sheet that occurs on the leading edge side when the documents are separated and conveyed by the separation unit 32. It is therefore possible to more quickly detect the documents bound on the leading edge side in the conveyance direction and prevent damage to the documents.

Second Embodiment

The second embodiment of the present invention will be described. The same reference numerals as in the first embodiment denote the same components.

Figure 11:
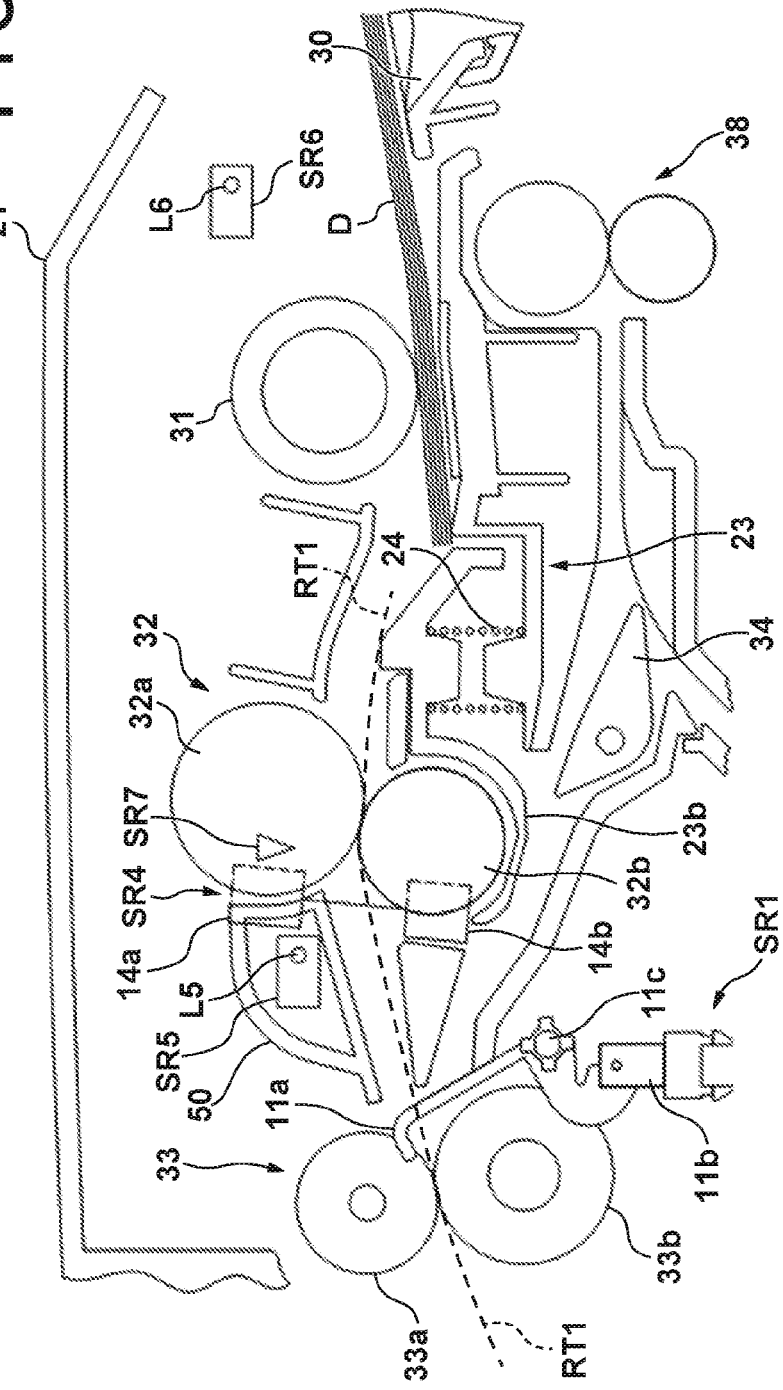
FIG. 11 is an explanatory view of an automatic document feeder according to another example.
Figure 12:
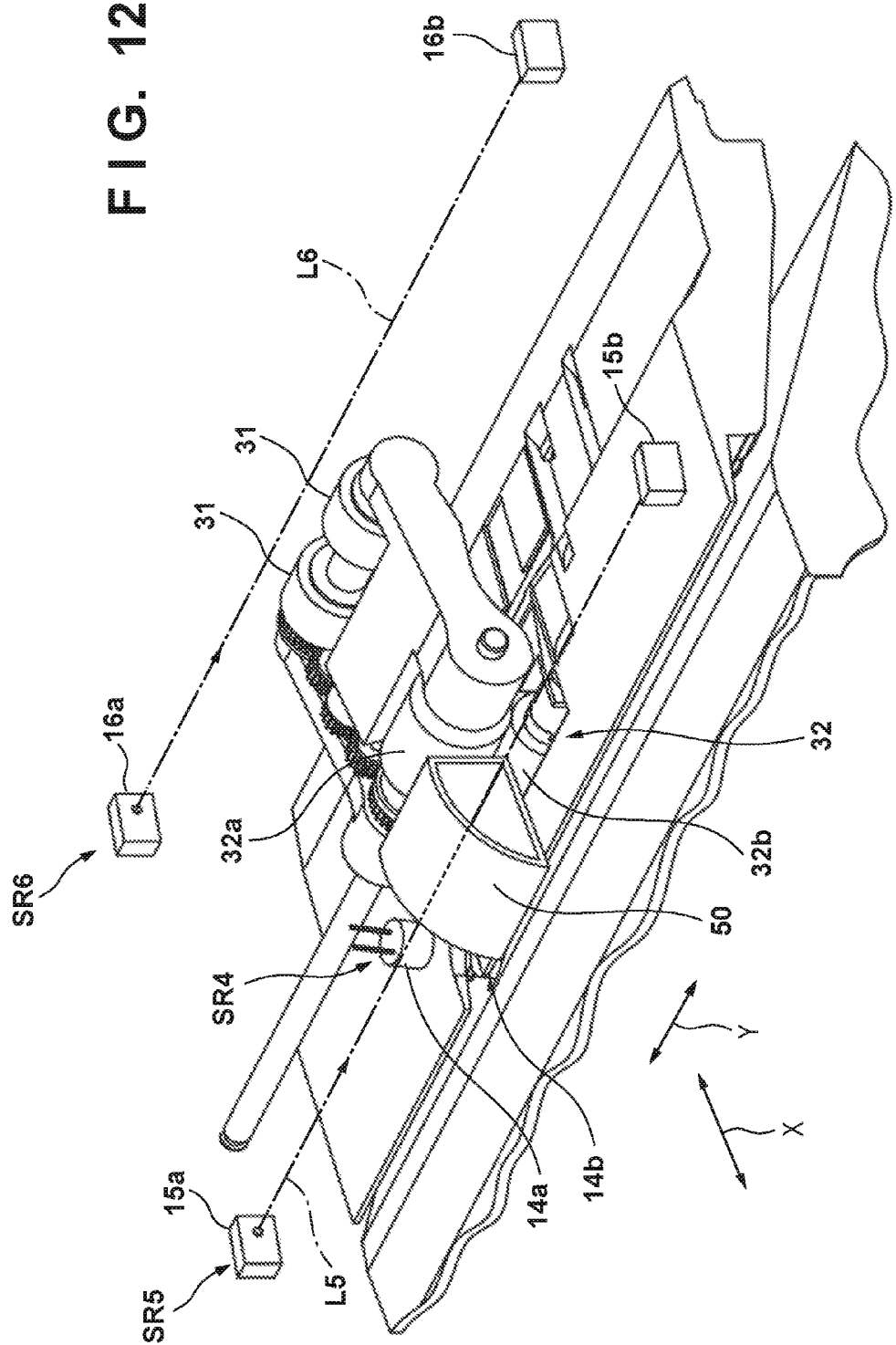
FIG. 12 is an explanatory view of an automatic document feeder according to another example.

An example of an arrangement in which a deformation of a bundle of documents bound by a staple ST at one corner on the leading edge side in the conveyance direction shown in FIG. 8B is distinguished from a bending of a sheet caused by skew correction and detected more accurately will be described. FIGS. 11 and 12 are explanatory views of a feeding device 2 according to this embodiment. In this embodiment, a regulating member 50 is provided at a position between a separation unit 32 and a conveyance unit 33.

The regulating member 50 is arranged apart upward from a conveyance path RT1 to regulate floating of a sheet passing through the separation unit 32. The regulating member 50 is not provided over all of the conveyance path RT1 in the widthwise direction but arranged in a partial section of the conveyance path RT1 in the widthwise direction. This arrangement makes it possible to regulate floating of a sheet that floats almost evenly due to skew correction without regulating uneven floating in the widthwise direction which occurs when a bundle of documents bound by a staple or the like is separated and conveyed. In the illustrated example, the regulating member 50 is arranged at the center in the widthwise direction. The regulating member 50 may be arranged not at the center but closer to a lateral side. However, arranging the regulating member 50 at the center is advantageous from the viewpoint of regulating the floating of the sheet that floats almost evenly in the widthwise direction of the conveyance path RT1.

The regulating member 50 is arranged between a light-emitting portion 15a and a light-receiving portion 15b of a detection unit SR5. The regulating member 50 includes a light transmitting portion such that light on an optical path L5 can pass through it. In this embodiment, the regulating member 50 is formed into a tubular portion extending in the widthwise direction of the conveyance path RT1, and its internal space serves as the light transmitting portion. However, the light transmitting portion may be formed by forming the regulating member 50 as a solid member using a translucent resin or glass.

Figure 13A:
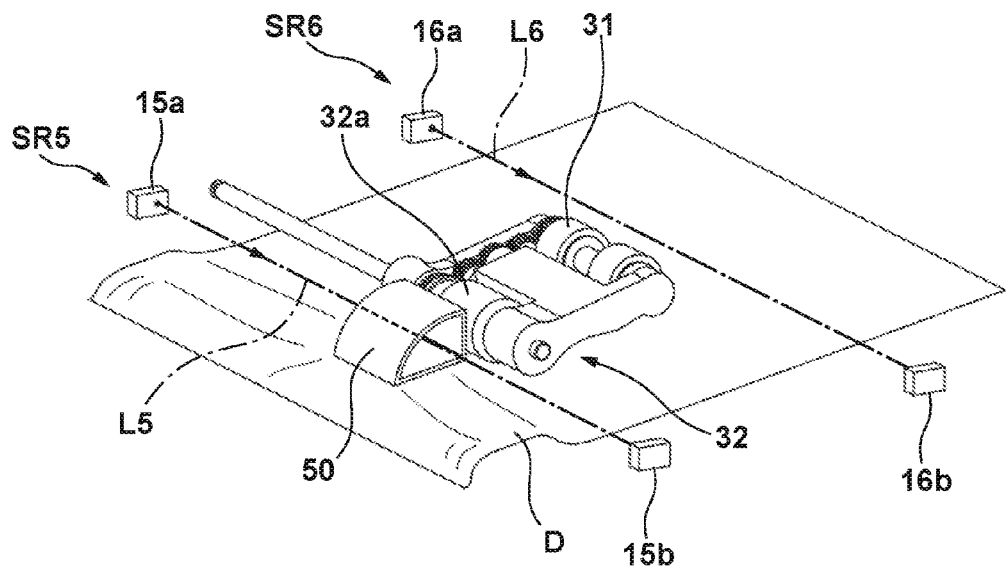
FIGS. 13A and 13B are views showing an example of detection of a document deformation.

Sheet deformation detection by the detection unit SR5 will be described with reference to FIGS. 13A and 13B. FIG. 13A shows a case in which a document D undergoes skew correction. Due to skew correction by the registration rollers 33a and 33b, the leading edge side of the document D almost evenly bends and floats in the widthwise direction. However, the floating is regulated by the regulating member 50. For this reason, the bending portion of the document D never blocks the optical path L5 and is therefore not detected by the detection unit SR5.

Figure 13B:
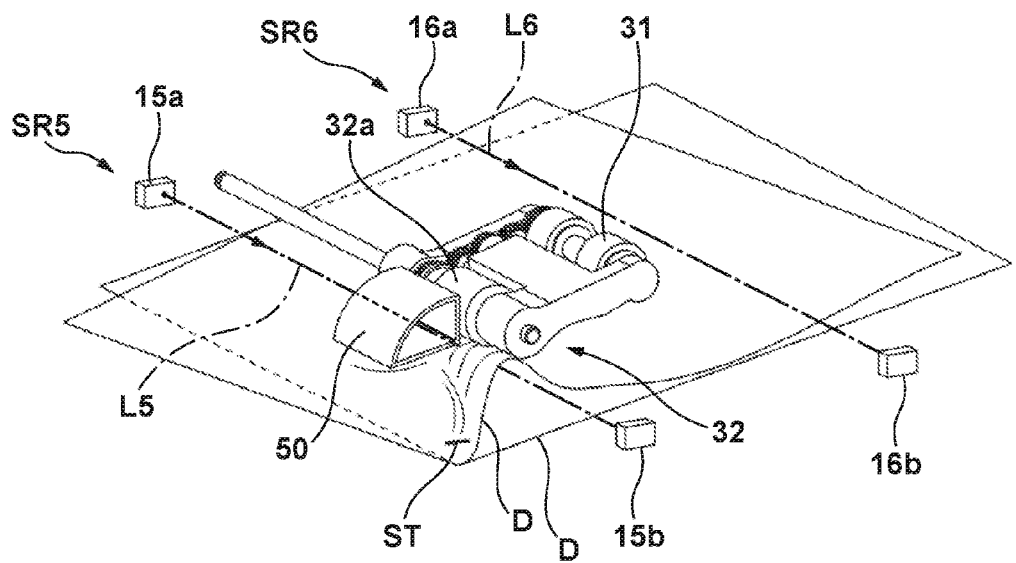

FIG. 13B shows a state in which a bundle of documents bound by the staple ST at one corner on the leading edge side in the conveyance direction deforms. As described with reference to FIG. 8B, since the bundle of documents is bound by the staple ST at one corner, the leading edge side of the bundle of documents floats unevenly in the widthwise direction, and the side of the staple ST floats higher. At this time, since the regulating member 50 is arranged in a partial section (at the center in this embodiment) in the widthwise direction, the side of the staple ST is not regulated by the regulating member 50 and floats beyond the regulation height of the regulating member 50. For this reason, the deformed portion of the floating sheet blocks the optical path L5, and the detection unit SR5 detects the deformation of the sheet.

In this way, the deformation of the bundle of documents bound by the staple ST at one corner on the leading edge side in the conveyance direction can be distinguished from the bending of the sheet caused by skew correction and detected more accurately. By structurally regulating the floating of the document D in skew correction by the regulating member 50, the degree of freedom in setting the position of the optical path L5 improves. This makes it possible to more correctly detect the deformation of the bundle of bound documents without making the apparatus main body large in the height direction. Note that in this embodiment, the deformation of the bundle of documents bound by the plurality of staples ST along the edge on the leading edge side in the conveyance direction, which has been described with reference to FIGS. 6C and 8A, is regulated by the regulating member 50 and is hardly detected by the detection unit SR5. However, this deformation can be detected by a detection unit SR4.

Figure 14A:
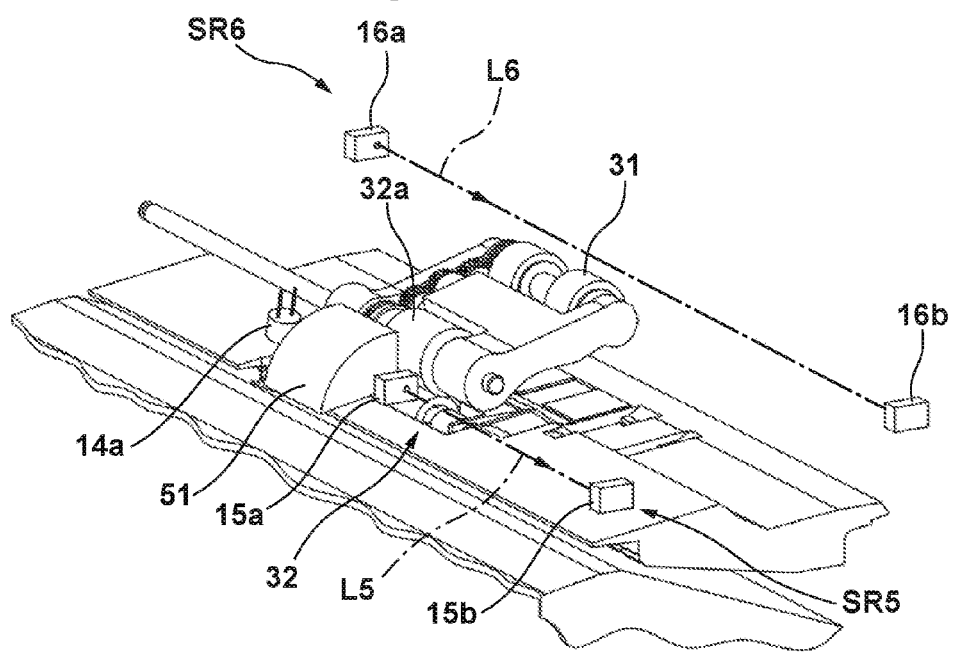
FIGS. 14A and 14B are views showing another example of a detection unit.

Another example of the detection unit SR5 will be described next with reference to FIGS. 14A to 15. In the example of FIG. 14A, a regulating member 51 without a light transmitting portion is provided in place of the regulating member 50. Like the regulating member 50, the regulating member 51 can regulate a floating of the document D even in the widthwise direction at the time of skew correction. The detection unit SR5 is arranged on a side of the regulating member 51 in the widthwise direction of the conveyance path RT1. In the example of FIG. 14A, the light-emitting portion 15a is arranged close to a lateral side of the regulating member 51, and the light-receiving portion 15b is arranged on a lateral side of the conveyance path RT1 in the widthwise direction so as to face the light-emitting portion 15a. With this arrangement, as in the example of FIG. 13A, it is possible to detect a sheet deformation uneven in the widthwise direction of the bundle of documents bound by the staple ST at one corner on the leading edge side in the conveyance direction without erroneously detecting a bending (floating) of the sheet caused by skew correction.

Figure 14B:
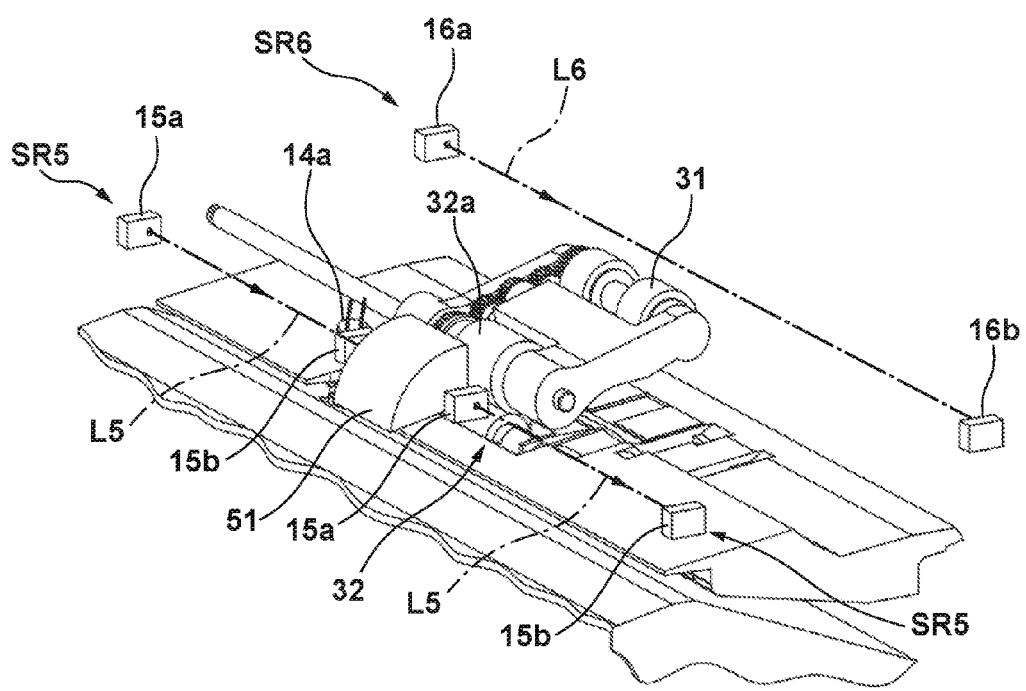

In the example of FIG. 14B, two detection units SR5 are provided in the example of FIG. 14A. The detection unit SR5 is arranged on each side of the regulating member 51 in the widthwise direction of the conveyance path RT1. In a bundle of documents bound by the staple ST at one corner on the leading edge side in the conveyance direction, the staple ST can be located on the left or right side. In the example of FIG. 14B, regardless of the location of the staple ST, it is possible to detect a sheet deformation uneven in the widthwise direction of the bundle of documents without erroneously detecting a bending (floating) of the sheet caused by skew correction.

Figure 15:
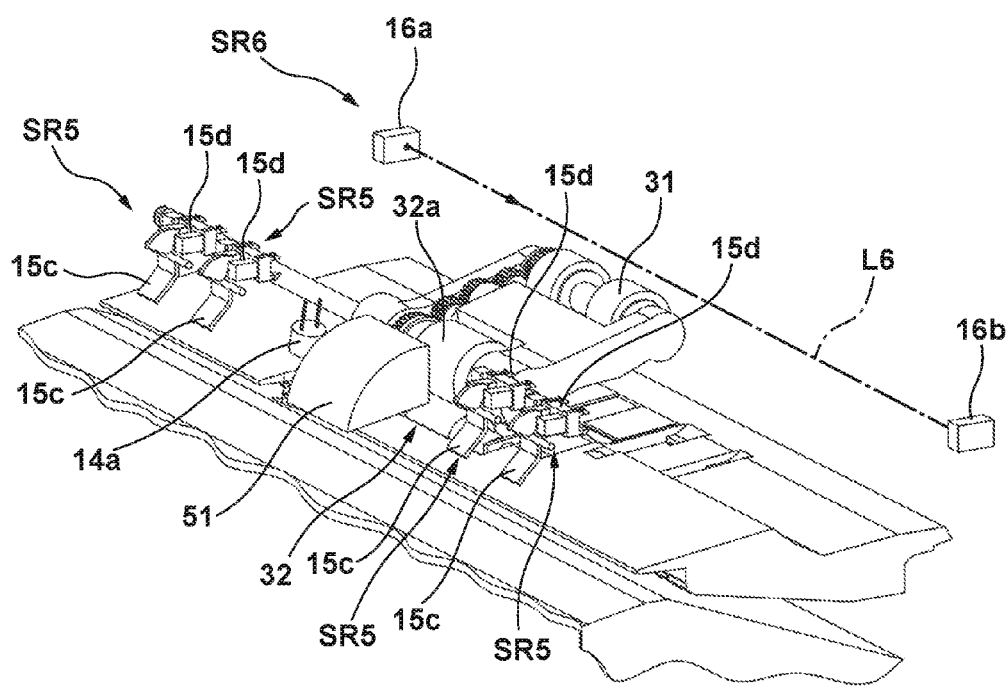
FIG. 15 is a view showing another example of the detection unit.

The example of FIG. 15 shows another example of the sensor type of the detection unit SR5 in the example of FIG. 14B. In the example of FIG. 15, the detection unit SR5 is a flag type sensor, and includes a flag 15c that is a movable member, and a photosensor (photointerrupter) 15d that detects a displacement of the flag 15c. A plurality of detection units SR5 are arranged in the widthwise direction of the conveyance path RT1. In the example of FIG. 15, two detection units SR5 are arranged on each side of the regulating member 51 in the widthwise direction of the conveyance path RT1. The flag 15c is arranged on a side of the regulating member 51, and displaces (here, pivots) when coming into contact with a sheet. If the document D floats, it comes into contact with the flag 15c, and the flag 15c pivots. This is detected by the photosensor 15d. It is therefore possible to detect the deformation of the sheet that floats unevenly in the widthwise direction of the bundle of documents bound by the staple ST at one corner on the leading edge side in the conveyance direction without erroneously detecting a bending (floating) of the sheet caused by skew correction.

Third Embodiment

An image processing apparatus (image reading apparatus) according to the third embodiment of the present invention will be described with reference to FIGS. 16 to 21.

Figure 16:
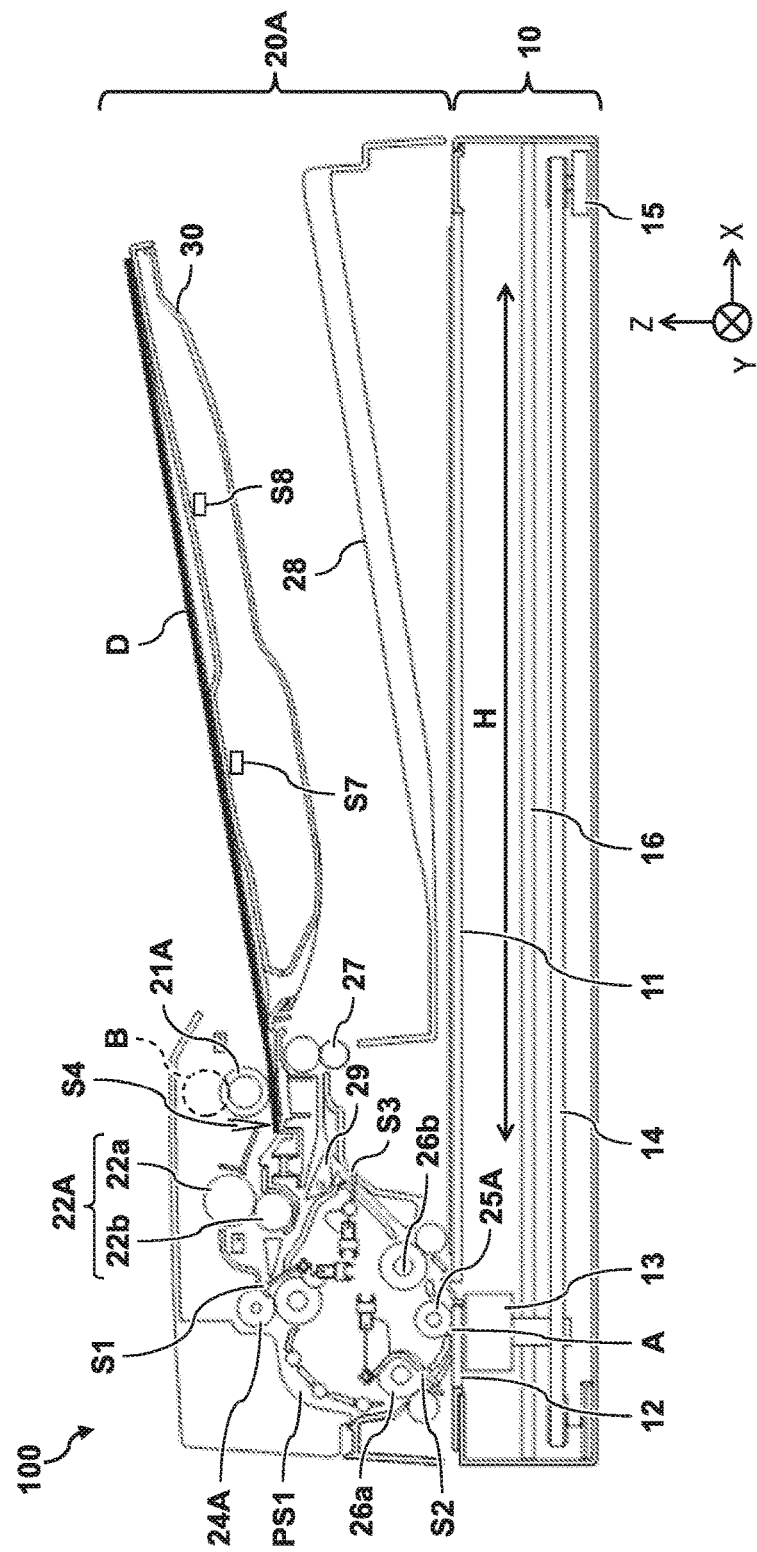
FIG. 16 is a view showing an image processing apparatus according to the third embodiment.

FIG. 16 is a view showing an image processing apparatus 100 according to the third embodiment. The image processing apparatus 100 includes, for example, an image reading unit 10 that reads the image of a document D, and a document feeding unit 20A (automatic document feeder or conveyance unit) that automatically feeds (automatically conveys) the document D placed on a document table 30 to a reading position A of the image reading unit 10 one by one. The document feeding unit 20A is supported by an opening/closing support member (not shown) such as a hinge so as to pivot about the far side in FIG. 16 with respect to the image reading unit 10. Hence, in the image processing apparatus 100, the document feeding unit 20A can be opened/closed with respect to the upper surfaces of a glass document table 11 and a flow reading glass 12.

[Document Image Reading Method]

A document image reading method includes a so-called "fixed reading method" of reading the image of a document placed on the glass document table 11 by the user and a so-called "flow reading method" of reading the image of a document fed onto the flow reading glass (reading position A) by the document feeding unit 20A. The image processing apparatus 100 according to the third embodiment is configured to read the image of the document D by both methods.

When reading the image of the document D by the "fixed reading method", the user opens the document feeding unit 20A, places the document D on the glass document table 11, and closes the document feeding unit 20A, thereby fixing the document D on the glass document table 11. The image reading unit 10 can read the image of the document D by causing an image reading sensor 13 to read the image of the document D while scanning under the glass document table 11. The scanning direction (the direction of an arrow H (the X direction in FIG. 16)) of the image reading sensor 13 will be referred to as a sub-scanning direction, and a direction (the Y direction in FIG. 16) orthogonal to the direction will be referred to as a main scanning direction.

When reading the image of the document D placed on the glass document table 11, the image reading sensor 13 irradiates the document D with light from a light source extending in the main scanning direction, and detects the reflected light, thereby reading the image of the document D. In addition, the image reading sensor 13 is fixed to a drive belt 14 and configured to be reciprocally movable in the sub-scanning direction (the direction of the arrow H) under the glass document table 11 along a guide shaft 16 when the driving force of a drive motor 15 is transmitted via the drive belt 14. As the drive motor 15, for example, a stepping motor or a DC motor is used.

Figure 17:
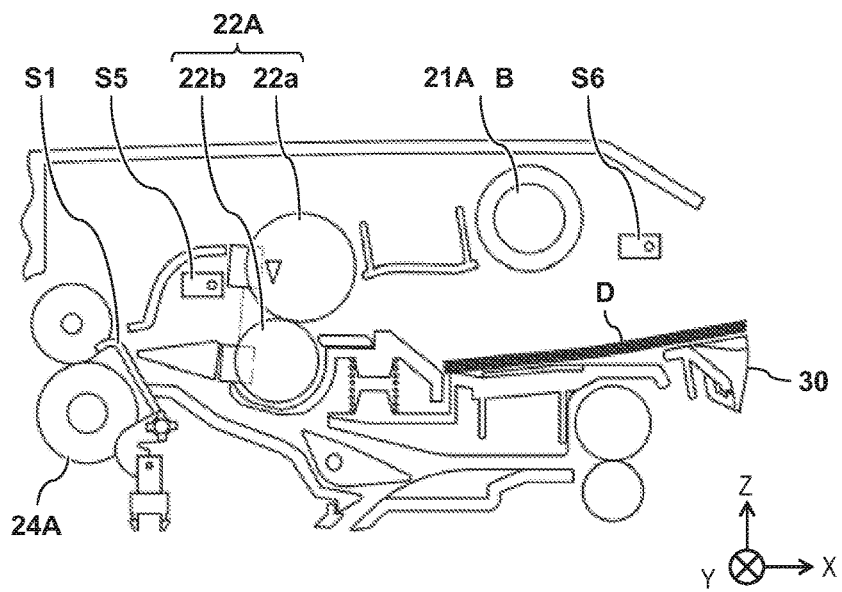
FIG. 17 is a view showing an arrangement near a pickup roller, a supply roller, and a conveyance roller.

On the other hand, when reading the image of the document D by the "flow reading method", the user places the document D (one or more documents) on the document table 30 of the document feeding unit 20A, as shown in FIGS. 16 and 17. FIG. 17 is a view showing an arrangement near a pickup roller 21A, a supply roller pair 22A, and a conveyance roller pair 24A as the feeding mechanism of the document feeding unit 20A.

A plurality of documents D can be placed on the document table 30. The document table 30 is provided with a side guide (not shown) configured to regulate the position of the placed document D in the main scanning direction. Additionally, a plurality of (for example, two) detection sensors S7 and S8 each configured to detect the document D placed on the document table 30 are provided in the document table 30 while being spaced apart from each other in the conveyance direction of the document. This enables detection of the length of the document D placed on the document table 30.

The pickup roller 21A is normally arranged at a position B not to impede the placement of the document D on the document table 30 by the user, as indicated by the broken line in FIG. 16 or as shown in FIG. 17. If a document detection sensor S4 detects that the documents D are placed on the document table 30, the document feeding unit 20A lowers the pickup roller 21A. The document D located at the uppermost position of the documents D placed of the document table 30 is picked up by the pickup roller 21A, fed into the unit, and supplied to the supply roller pair 22A including a plurality of rollers.

The supply roller pair 22A (separation roller pair) supplies the document D picked up by the pickup roller 21A to the conveyance roller pair 24A (registration roller pair) at the subsequent stage while causing the plurality of rollers to clamp the document D. The supply roller pair 22A includes, for example, a separation roller 22*a* and a retard roller 22*b*, and has the function of a separation unit that separates and conveys the document D picked up by the pickup roller 21A one by one. More specifically, the separation roller 22*a* is rotated to feed the document D in the conveyance direction, and the retard roller 22*b* is rotated to feed the document D in a direction opposite to the conveyance direction, thereby separating and conveying the document D fed by the pickup roller 21A one by one.

A first detection unit that detects the document D conveyed to the conveyance roller pair 24A is provided on the upstream side of a sheet-conveying position of the conveyance roller pair 24A in the conveyance direction. For example, the first detection unit includes a registration sensor S1 configured to detect that the leading edge of the document D has passed a position on the conveyance path on the upstream side of the sheet-conveying position of the conveyance roller pair 24A with respect to the conveyance direction, and detects the document D conveyed to the conveyance roller pair 24A based on a detection signal from the registration sensor S1. Here, the registration sensor S1 may be configured to detect not only the leading edge of the document D but also the trailing edge of the document D. This makes it possible not only to measure the timing of correcting the skew of the document D but also to measure the feed timing for the next document D by the pickup roller 21A or determine the size of the document D in accordance with the timing of detecting the leading edge and the trailing edge of the document D.

Figure 18:
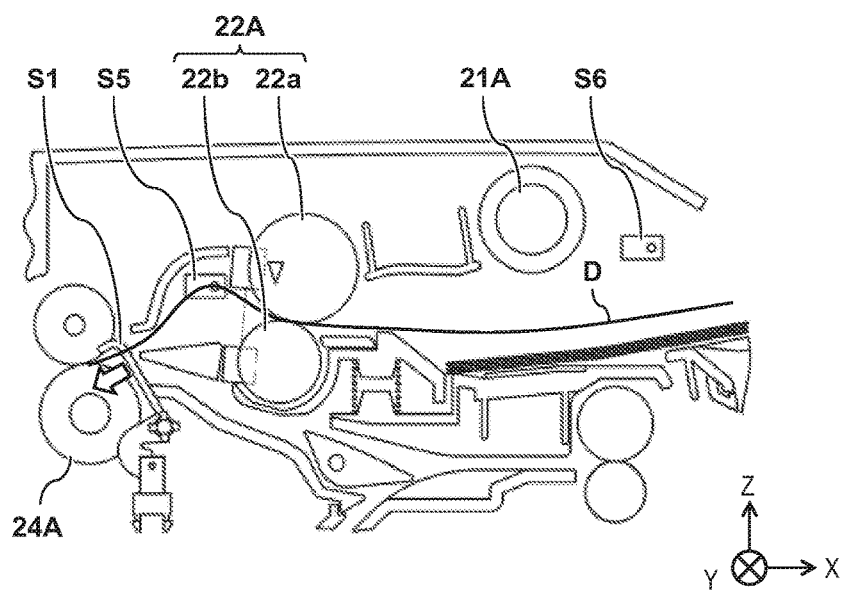
FIG. 18 is a view showing a state in which a skew of a document is corrected.

If the registration sensor S1 detects the leading edge of the document D, the rotation of the plurality of rollers in the conveyance roller pair 24A stops, and the leading edge of the document D supplied from the supply roller pair 22A is pressed against the nip portion of the conveyance roller pair 24A. At this time, supply of the document D by the supply roller pair 22A is continuously performed, and a portion (leading edge portion) of the document D is made to float from the conveyance path (a loop is formed in the document D), as shown in FIG. 18, thereby correcting the skew of the document D.

In the skew correction of the document D, the floating amount (loop amount) of the portion of the document D pressed against the conveyance roller pair 24A (nip portion) changes depending on the size or grammage of the document D. Hence, depending on the size or grammage of the document D, the floating amount of the portion of the document D from the conveyance path may be insufficient, and the skew correction may not be performed sufficiently. To prevent this, in the document feeding unit 20A, a second detection unit configured to detect the document D that partially floats from the conveyance path is provided on the upstream side of the detection position of the first detection unit (the detection position of the registration sensor S1) with respect to the conveyance direction as a floating detection unit configured to detect the floating of the document D from the conveyance path RT1. When the document D (the floating of the document D) is detected by the second detection unit, it is determined that the skew correction of the document D is normally performed, and the conveyance of the document D by the conveyance roller pair 24A is started.

For example, the second detection unit is a sensor provided at a position off the conveyance path, and includes a floating detection sensor S5 (second sensor) configured to detect a portion (leading edge) of the document D that bends such that the portion floats from the conveyance path. The floating detection sensor S5 is provided above the conveyance path between the supply roller pair 22A and the conveyance roller pair 24A. As a detailed arrangement, the floating detection sensor S5 includes an emitting portion that emits light crossing the upper side of the conveyance path, and a light-receiving portion that receives the light emitted by the emitting portion, and detects the portion of the document D floating from the conveyance path. That is, the floating detection sensor S5 is configured to detect the portion of the document D floating from the conveyance path when the portion shields the light from the emitting portion. By using the thus configured floating detection sensor S5, the second detection unit can detect the document D partially floating from the conveyance path based on the detection signal from the floating detection sensor S5. That is, when the portion (leading edge) of the document D floating from the conveyance path is detected by the floating detection sensor S5 in skew correction, the second detection unit can detect that the floating amount of the portion of the document D in skew correction reaches a predetermined amount. The floating amount means, for example, the distance (maximum distance) between the conveyance path and the portion of the document D that floats from the conveyance path.

After the document D is detected by the floating detection sensor S5, and the skew correction of the document D ends, the document feeding unit 20A rotates the plurality of rollers of the conveyance roller pair 24A to convey the document D to a point (reading position A) on the flow reading glass 12 via a path PS1. According to the timing at which the leading edge of the document D is detected by a read sensor S2, reading of the image of the document D by the image reading sensor 13 at rest under the flow reading glass 12 starts. At this time, the image of the document D is read by the image reading sensor 13 while conveying the document D in a state in which its floating from the upper surface of the flow reading glass 12 is regulated by a platen roller 25A that rotates at a predetermined rotational speed. Read roller pairs 26a and 26b are provided on the upstream and downstream sides of the platen roller 25A with respect to the document conveyance direction, respectively. The document D is conveyed by the read roller pairs 26a and 26b while the image reading sensor 13 reads the image of the document D.

When reading only the image on one surface of the document D, the document D whose image on the one surface is read by the image reading sensor 13 is conveyed by the read roller pair 26b to a discharge roller pair 27 and discharged to a document discharge unit 28. On the other hand, when reading both surfaces of the document D, after the image on the first surface of the document D is read by the image reading sensor 13, the discharge roller pair 27 that clamps the document D is stopped. The discharge roller pair 27 is rotated in the reverse direction to bring the document D back into the apparatus. At this time, the document D is fed by a flapper 29 to the path PS1 again via a path PS2. The document D can thus be conveyed onto the flow reading glass 12 such that the second surface of the document D is read by the image reading sensor 13. The document D whose image on the second surface is read by the image reading sensor 13 is discharged to the document discharge unit 28 by the discharge roller pair 27.

In the document feeding unit 20A according to this embodiment, as shown FIGS. 16 and 17, a second floating detection sensor S6 having the same arrangement as the above-described floating detection sensor S5 is provided on the upstream side of a sheet-conveying position of the pickup roller 21A (supply roller pair 22A). For example, if a document (bound document) formed by binding a plurality of sheets is conveyed by the pickup roller 21A or the supply roller pair 22A, the bound document may bend such that the trailing edge floats from the conveyance path. The second floating detection sensor S6 is arranged to detect the trailing edge of the document floating from the conveyance path. If the second floating detection sensor S6 detects document D, it is determined that a bound document is being conveyed by the document feeding unit 20A, and the feeding of the document D by the document feeding unit 20A is stopped.

[Internal Arrangement of Image Processing Apparatus]

Figure 19:
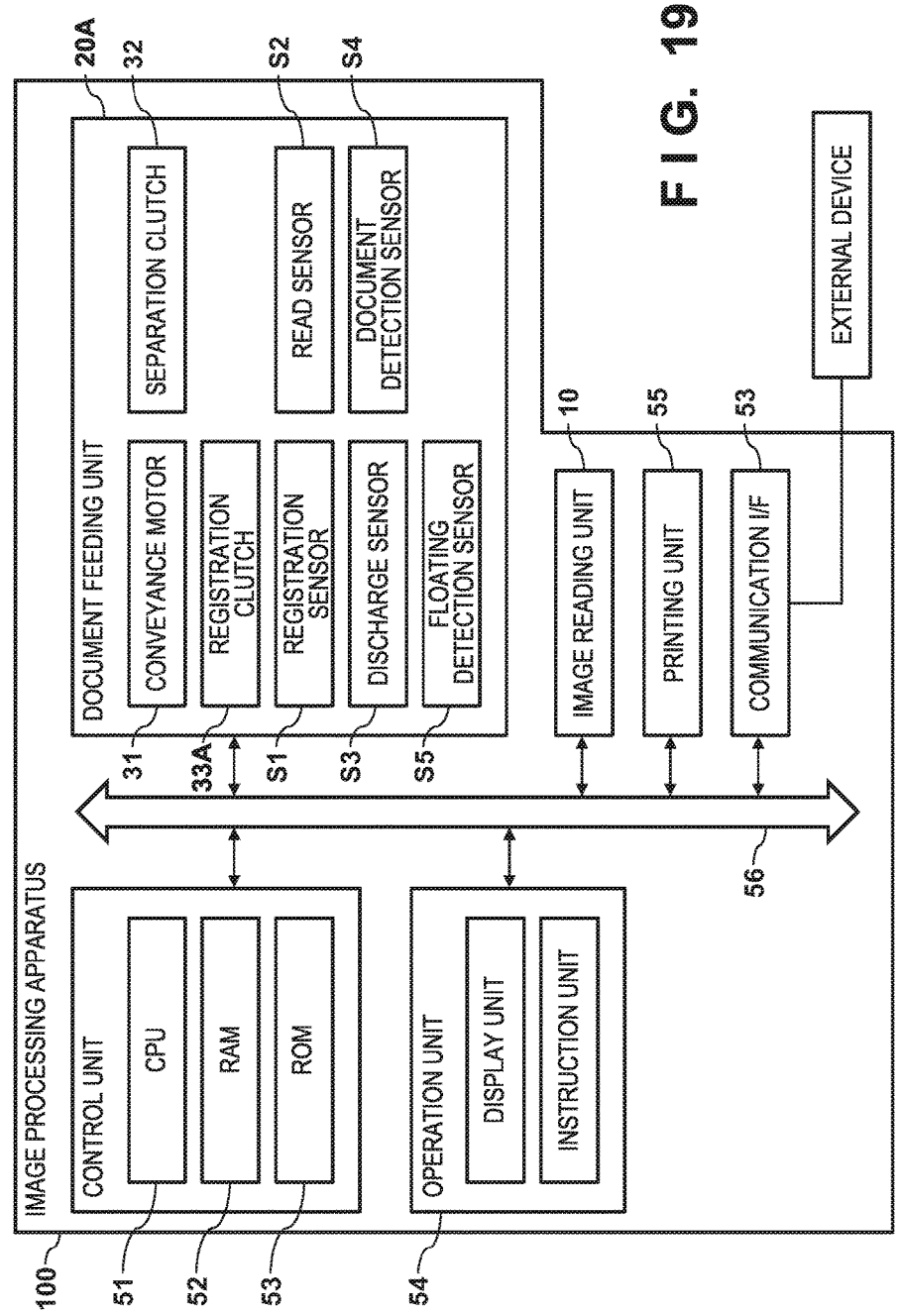
FIG. 19 is a block diagram showing the internal arrangement of the image processing apparatus.

The internal arrangement of the image processing apparatus 100 will be described next. FIG. 19 is a block diagram showing the internal arrangement of the image processing apparatus 100. The image processing apparatus 100 includes a control unit that generally controls the overall operation of the image processing apparatus 100. The control unit includes a CPU 50, a RAM 51, and a ROM 52 and is connected to the image reading unit 10, the document feeding unit 20A, a communication I/F 53, an operation unit 54, and a printing unit 55 via a system bus 56. The printing unit 55 prints (outputs) the image read by the image reading unit 10. The document feeding unit 20A is provided with a conveyance motor 31, a separation clutch 32, a registration clutch 33A, and a sensor group. The sensor group includes the registration sensor S1, the read sensor S2, a discharge sensor S3, a document detection sensor S4, and the floating detection sensor S5. Note that the sensor group also includes the second floating detection sensor S6 and detection sensors S7 and S8, which are not illustrated in FIG. 19.

The RAM 51 serves as the work area of the CPU 50 and an area to temporarily store data. A firmware program configured to drive the document feeding unit 20A and a boot program configured to control the firmware program are written in the ROM 52. These programs are read out and executed by the CPU 50. The communication I/F 53 is connected to a system controller or an external device. A document feeding instruction or image data is transferred via the communication I/F 53. The operation unit 54 is formed from, for example, a display unit (a liquid crystal display or an LED), an instruction unit (a button or a touch panel), and the like, and accepts various kinds of operations such as a reading instruction, a designation of the number of copies, a designation of a reading document size, and a scaling factor. The image reading unit 10 optically reads the image of the fed document D, performs image processing such as image determination and image correction, and outputs the image to the system controller via the communication I/F 53.

The conveyance motor 31 generates a rotation force to rotate the pickup roller 21A, the separation roller 22a, the retard roller 22b, the rollers of the conveyance roller pair 24A, and the discharge roller pair 27. The separation clutch 32 cuts the rotation force of the conveyance motor 31 to the pickup roller 21A and the separation roller 22a. That is, the pickup roller 21A and the separation roller 22a stop the document feeding operation of feeding the document D (are configured to stop the document feeding operation) if the separation clutch 32 operates so the pickup roller 21A and the separation roller 22a cannot receive the rotation force of the conveyance motor 31. Note that the pickup roller 21A and the separation roller 22a are configured to be brought into contact with the document D by a plunger (not shown) and stop the document feeding operation if the plunger operates to separate them from the document D. The registration clutch 33A cuts the rotation force of the conveyance motor 31 to the rollers of the conveyance roller pair 24A.

The registration sensor S1 is arranged near the sheet-conveying position of the conveyance roller pair 24A on the upstream side in the conveyance direction, and detects the document D conveyed to the conveyance roller pair 24A by the supply roller pair 22A. The read sensor S2 is arranged near the read roller pair 26a on the downstream side in the conveyance direction, and detects the document D conveyed to the platen roller 25A (onto the flow reading glass 12). The discharge sensor S3 is disposed near the flapper 29, and detects that the document D read by the image reading sensor 13 via the flow reading glass 12 is conveyed to the discharge position. The document detection sensor S4 detects the presence/absence of the document D placed on the document table 30. The floating detection sensor S5 is arranged above the conveyance path between the supply roller pair 22A and the conveyance roller pair 24A, and detects the document D with a portion (leading edge) floating from the conveyance path.

The CPU 50 reads out a program stored in the ROM 52 and executes it on the RAM 51, thereby controlling the operations of various constituent elements of the image processing apparatus 100 and implementing an operation according to this embodiment to be described later with reference to a flowchart and the like. Various operations and settings for the image processing apparatus 100 (the image reading unit 10, the document feeding unit 20A, and the printing unit 55) are done via the operation unit 54.

[Control of Reading Processing in Image Processing Apparatus]

Figure 20:
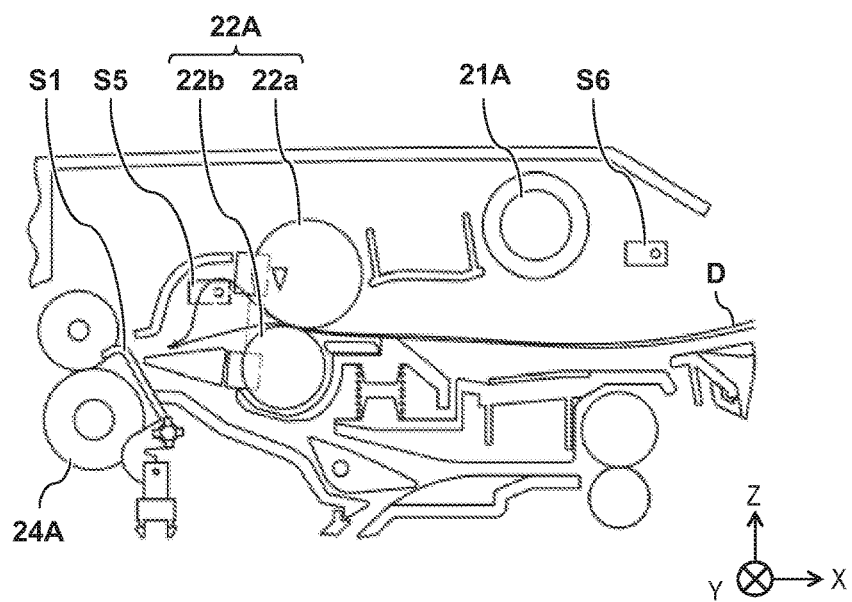
FIG. 20 is a view showing a state in which a bound document is fed by a document feeding unit.

A document (bound document) formed by binding a plurality of sheets with each other using, for example, a stapler, a clip, or gluing may be placed by the user on the document table 30 of the document feeding unit 20A. In such a bound document, as shown in FIG. 20, before skew correction starts, that is, before the leading edge reaches the nip portion of the conveyance roller pair 24A, the leading edge of the uppermost sheet floats from the conveyance path upon conveyance by the supply roller pair 22A. For this reason, even if the floating detection sensor S5 detects the bound document partially floating from the conveyance path, the second detection unit erroneously detects that the floating amount of the document in the skew correction reaches a predetermined amount, and the skew correction ends (a loop for skew correction is formed). In this case, the bound document is conveyed by the conveyance roller pair 24A, resulting in a jam in the apparatus and damage to the document. In the image processing apparatus 100 according to this embodiment, if the document D is detected by the second detection unit (floating detection sensor S5) before detection of the document D by the first detection unit (registration sensor S1), it is determined that the conveyed document D is a bound document, and feeding (conveyance) of the document D by the document feeding unit 20A is stopped.

Figure 21:
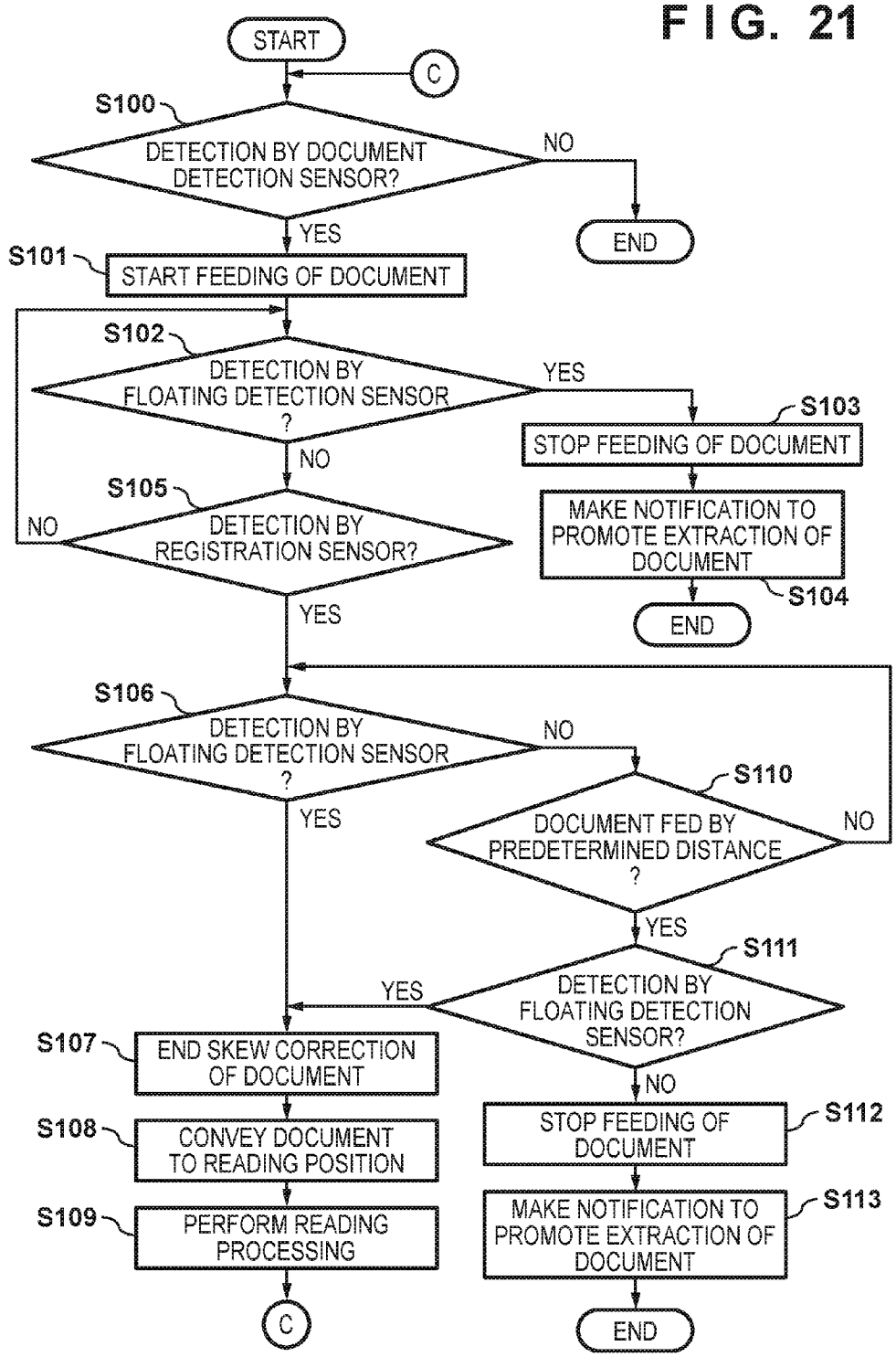
FIG. 21 is a flowchart showing control of reading processing of the document in the image processing apparatus.

Control of reading processing of the document D in the image processing apparatus 100 according to this embodiment will be described below with reference to FIG. 21. FIG. 21 is a flowchart showing control of reading processing of the document D in the image processing apparatus 100. Note that processes (the steps of the flowchart) to be described below are implemented when the CPU 50 reads out a control program stored in the ROM 52 in advance to the RAM 51 and executes it. The processes can also be implemented by a circuit such as an ASIC.

In step S100, the CPU 50 determines whether the document D is detected by the document detection sensor S4. If the document D is detected by the document detection sensor S4 (YES in step S100), the process advances to step S101, and the CPU 50 rotates the pickup roller 21A, the separation roller 22a, and the retard roller 22b by the conveyance motor 31, thereby starting feeding the document D.

In step S102, the CPU 50 determines whether the document D is detected by the floating detection sensor S5. At this time, if the document D is detected by the floating detection sensor S5 (YES in step S102), the document D is detected by the floating detection sensor S5 before detection of the document D by the registration sensor S1. Hence, in this case, the CPU 50 determines that a bound document formed by binding a plurality of sheets is being conveyed by the document feeding unit 20A. The process advances to step S103 to stop the feeding of the document by the document feeding unit 20A. At this time, the CPU 50 may stop execution of the image reading job of the document D. The image reading job means a job to cause the document feeding unit 20A to feed the document D placed on the document table 30 to the reading position A and cause the image reading sensor 13 to read the document D fed to the reading position A.

In step S104, the CPU 50 makes a notification to the user to promote extraction of the document D from the conveyance path. For example, the CPU 50 may make the notification by causing the display unit (operation unit 54) to display a screen to promote extraction of the document D from the conveyance path, or may transfer the notification to the computer of the user via the communication I/F 53. The notification to promote extraction of the document D from the conveyance path is, for example, a notification to promote the user to place the document D again on the document table 30 or a notification representing that the document D cannot be continuously fed. By this notification, the user can extract the bound document from the conveyance path and place the document D formed by removing the staples or the like from the bound document on the document table 30 again.

On the other hand, if the document D is not detected by the floating detection sensor S5 (NO in step S102), the process advances to step S105. In step S105, the CPU 50 determines whether the document D is detected by the registration sensor S1. If the document D is not detected by the registration sensor S1 (NO in step S105), the process returns to step S102. If the document D is detected by the registration sensor S1 (YES in step S105), it is determined that the document D is conveyed to the conveyance roller pair 24A, and the process advances to step S106. Here, if the document D is detected by the registration sensor S1, the CPU 50 stops the rotation of the plurality of rollers in the conveyance roller pair 24A. Alternatively, if the plurality of rollers stop rotating and are at rest at the time of detection of the document D by the registration sensor S1, the CPU 50 maintains the state. The leading edge of the document D is thus pressed against (brought into contact with) the nip portion of the conveyance roller pair.

In step S106, the CPU 50 performs skew correction of the document D by making the leading edge of the document D float from the conveyance path while feeding the document D by the supply roller pair 22A, and determines whether the document D is detected by the floating detection sensor S5. If the document D is detected by the floating detection sensor S5 (YES in step S106), the process advances to step S107. In step S107, the CPU 50 determines that the floating amount of the leading edge of the document D in skew correction reaches a predetermined amount, and the skew correction of the document D is normally performed, and ends the skew correction of the document D. In step S108, the CPU 50 rotates the plurality of rollers in the conveyance roller pair 24A and causes the conveyance roller pair 24A to convey the document D to the reading position A. In step S109, the CPU 50 causes the image reading sensor 13 to read the image of the document D fed to the reading position A (perform reading processing). In some cases, even if the conveyance roller pair 24A is caused to convey the document D by such a distance that eliminates the floating of the document D, the detection signal of the document D may continuously be output from the floating detection sensor S5. In this case, the CPU 50 may determine that a bound document is conveyed by the conveyance roller pair 24A, and stop feeding of the document D by the document feeding unit 20A.

On the other hand, if the document D is not detected by the floating detection sensor S5 in step S106 (NO in step S106), the process advances to step S110. In step S110, the CPU 50 determines whether the document D is fed by a predetermined distance by the supply roller pair 22A in a state in which the document D is pressed against the nip portion of the conveyance roller pair 24A. The predetermined distance is set as, for example, an amount to feed the document D by the supply roller pair 22A after detection of the document D by the registration sensor S1 to make the document D float from the conveyance path so that it is detected by the floating detection sensor S5. In other words, the predetermined distance is set such that the document D is normally detected by the floating detection sensor S5 when the supply roller pair 22A feeds the document D by the predetermined distance in any type of document with a different size or grammage.

In step S110, if the document D is not fed by the predetermined distance by the supply roller pair 22A (NO in step S110), the process returns to step S106. If the document D is fed by the predetermined distance (YES in step S110), the process advances to step S111. In step S111, the CPU 50 determines whether the document D is detected by the floating detection sensor S5 because the document D is fed by the predetermined distance by the supply roller pair 22A. If the document D is detected by the floating detection sensor S5 (YES in step S111), the process advances to step S107. If the document D is not detected by the floating detection sensor S5 (NO in step S111), the process advances to step S112. In step S112, the CPU 50 determines that a floating error (loop error) of the document D has occurred, and stops feeding of the document D by the document feeding unit 20A. At this time, the CPU 50 may stop execution of the image reading job. In step S113, the CPU 50 makes a notification to the user to promote extraction of the document D from the conveyance path.

As described above, in the image processing apparatus 100 according to this embodiment, if the document D is detected by the floating detection sensor S5 before detection of the document D by registration sensor S1, it is determined that a bound document is being conveyed by the document feeding unit 20A, and feeding of the document D by the document feeding unit 20A is stopped. Accordingly, even if the bound document partially floating from the conveyance path is detected by the floating detection sensor, it is possible to avoid erroneously detecting that the floating amount of the document in skew correction reaches a predetermined amount, and the skew correction ends. That is, it is possible to avoid a paper jam caused by conveyance of the bound document by the conveyance roller pair 24A.

In the above-described embodiment, the arrival of the document at the conveyance roller pair 24A is detected based on detection of the document D by the registration sensor S1. However, the arrival of the document at the conveyance roller pair 24A may be detected by counting the time from the start of document conveyance by the pickup roller 21A. According to this arrangement as well, even if the bound document partially floating from the conveyance path is detected by the floating detection sensor, it is possible to avoid erroneously detecting the floating of the document in skew correction.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-114681, filed Jun. 8, 2016, No. 2016-114682, filed Jun. 8, 2016, and No. 2016-205455, filed Oct. 19, 2016, which are hereby incorporated by reference herein in their entirety.

What is claimed is:

1. A conveyance apparatus comprising:
a separation unit including a roller and a separation member configured to pressure-contact the roller, the separation unit being configured to separate and convey a sheet at a pressure-contact position of the roller and separation member;
a skew correction unit arranged on a downstream side of the pressure-contact position with respect to a conveyance direction of the sheet and including a pair of rollers which form a nip portion against which a leading edge of the sheet is abutted so as to correct a skew of the sheet by deforming the sheet;
a first detector arranged so as to detect the sheet at a first detecting position on the downstream side of the pressure-contact position and an upstream side of the nip portion with respect to the conveyance direction and configured to detect a height-direction deformation of the sheet being separated and being conveyed at the pressure-contact position, the first detecting position being a position reached by the sheet deformed and skew-corrected by the skew correction unit;
a second detector configured to detect the sheet at a second detecting position on a downstream side of the first detector and an upstream side of the nip portion with respect to the conveyance direction; and
a controller configured to:
stop conveyance of the sheet by the separation unit if the first detector detects the sheet before the second detector detects the sheet;
continue conveyance of the sheet by the separation unit if the first detector does not detect the sheet before the second detector detects the sheet; and
continue conveyance of the sheet by the separation unit if the sheet deformed and skew-corrected by the skew correction unit is at the first detecting position after the second detector detects the sheet.

2. The apparatus according to claim 1, wherein the controller is configured to continue conveyance of the sheet by the separation unit if the first detector detects the sheet after the second detector detects the sheet.

3. The apparatus according to claim 1, wherein the first detecting position is closer to the pressure-contact position than to the nip portion.

4. The apparatus according to claim 1, wherein the first detector detects floating of the sheet caused when a bundle of sheets which are bound is separated and conveyed by the separation unit.

5. The apparatus according to claim 1, wherein the first detector comprises a photosensor including a light-emitting unit and a light-receiving unit, and
an optical path of the photosensor is set in a direction to cross a conveyance path of the sheet and at a position apart upward from a conveyance plane of the conveyance path.

6. The apparatus according to claim 1, further comprising:
a stacking unit on which the sheet to be separated and conveyed by the separation unit is stacked; and
a third detector configured to detect the deformation of the sheet at a third detecting position on an upstream side of the pressure-contact position of the separation unit with respect to the conveyance direction,
wherein if the third detector detects the sheet, the controller stops conveyance of the sheet by the separation unit.

7. The apparatus according to claim 1, wherein the controller controls the skew correction unit to convey the sheet that has been skew-corrected by the skew correction unit to the downstream side of the nip position with respect to the conveyance direction if the sheet is detected by the first detector after the sheet is detected by the second detector.

8. The apparatus according to claim 1, further comprising a notification unit configured to notify a user to promote extraction of the sheet when the controller stops conveyance of the sheet by the separation unit due to detecting of the sheet by the first detector before the second detector detects the sheet.

9. An image reading apparatus comprising:
a conveyance apparatus; and
an image sensor configured to read an image of a sheet conveyed by the conveyance apparatus,
wherein the conveyance apparatus comprises:
a separation unit including a roller and a separation member configured to pressure-contact the roller, the separation unit being configured to separate and convey the sheet at a pressure-contact position of the roller and separation member;
a skew correction unit arranged on a downstream side of the pressure-contact position with respect to a conveyance direction of the sheet and including a pair of rollers which form a nip portion against which a leading edge of the sheet is abutted so as to correct a skew of the sheet by deforming the sheet;
a first detector arranged so as to detect the sheet at a first detecting position on the downstream side of the pressure-contact position and an upstream side of the nip portion with respect to the conveyance direction and configured to detect a height-direction deformation of the sheet being separated and being conveyed at the pressure-contact position, the first detecting position being a position reached by the sheet deformed and skew-corrected by the skew correction unit;
a second detector configured to detect the sheet at a second detecting position on a downstream side of the first detector and an upstream side of the nip portion with respect to the conveyance direction; and
a controller configured to:
stop conveyance of the sheet by the separation unit if the first detector detects the sheet before the second detector detects the sheet;
continue conveyance of the sheet by the separation unit if the first detector does not detect the sheet before the second detector detects the sheet; and
continue conveyance of the sheet by the separation unit if the sheet deformed and skew-corrected by the skew correction unit is at the first detecting position after the second detector detects the sheet.

10. An image forming apparatus comprising:
an image reading apparatus; and
a printer configured to print an image read by the image reading apparatus on a printing medium, wherein the image reading apparatus comprises:
a conveyance apparatus; and
an image sensor configured to read an image of a sheet conveyed by the conveyance apparatus, and the conveyance apparatus comprises:
a separation unit including a roller and a separation member configured to pressure-contact the roller, the separation unit being configured to separate and convey the sheet at a pressure-contact position of the roller and separation member;
a skew correction unit arranged on a downstream side of the pressure-contact position with respect to a conveyance direction of the sheet and including a pair of rollers which form a nip portion against which a leading edge of the sheet is abutted so as to correct a skew of the sheet by deforming the sheet;
a first detector arranged so as to detect the sheet at a first detecting position on the downstream side of the pressure-contact position and an upstream side of the nip portion with respect to the conveyance direction and configured to detect a height-direction deformation of the sheet being separated and being conveyed at the pressure-contact position, the first detecting position being a position reached by the sheet deformed and skew-corrected by the skew correction unit;
a second detector configured to detect the sheet at a second detecting position on a downstream side of the first detector and an upstream side of the nip portion with respect to the conveyance direction; and
a controller configured to:
stop conveyance of the sheet by the separation unit if the first detector detects the sheet before the second detector detects the sheet;
continue conveyance of the sheet by the separation unit if the first detector does not detect the sheet before the second detector detects the sheet; and
continue conveyance of the sheet by the separation unit if the sheet deformed and skew-corrected by the skew correction unit is at the first detecting position after the second detector detects the sheet.

\* \* \* \* \*